Figure 5:
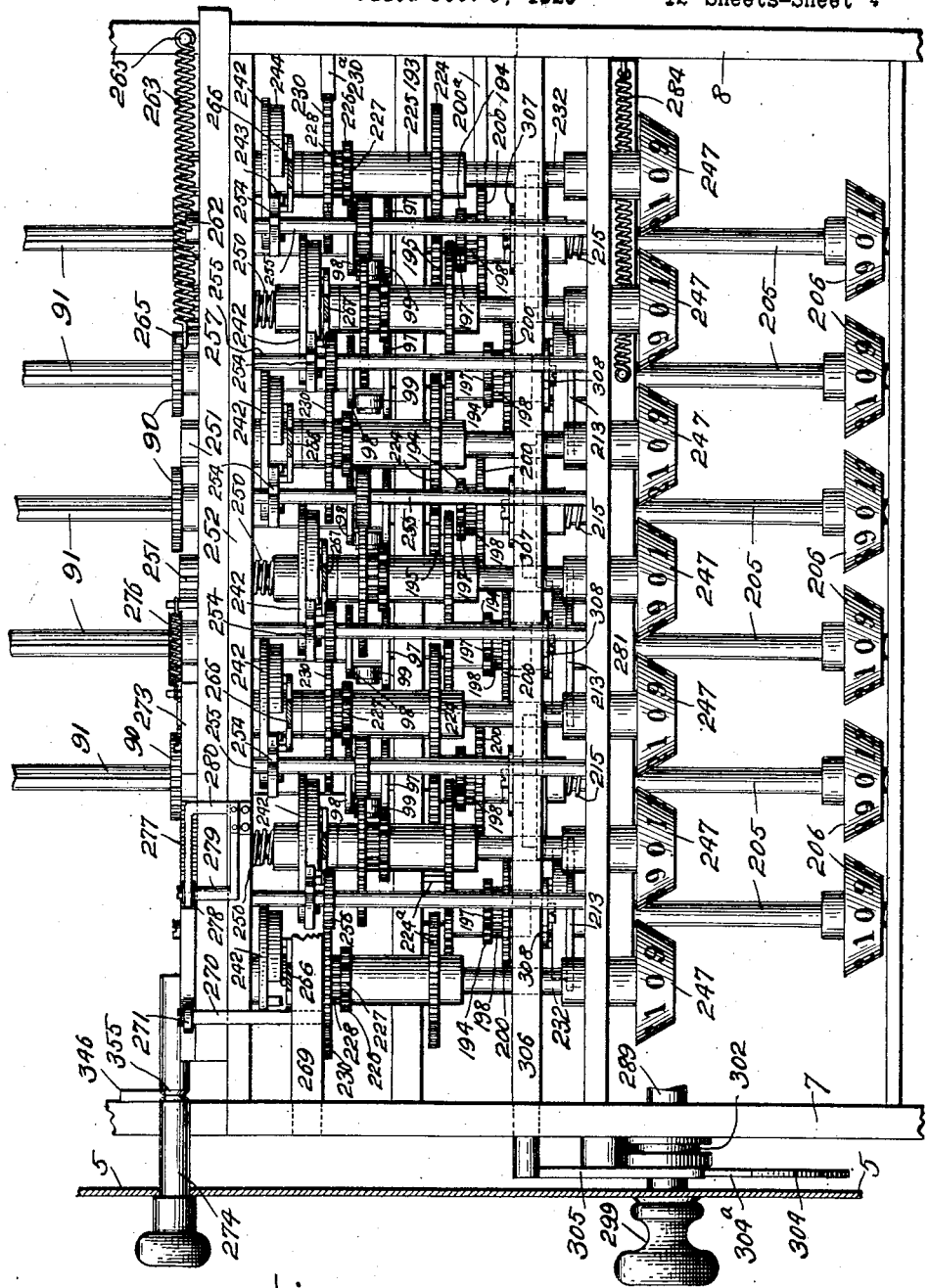

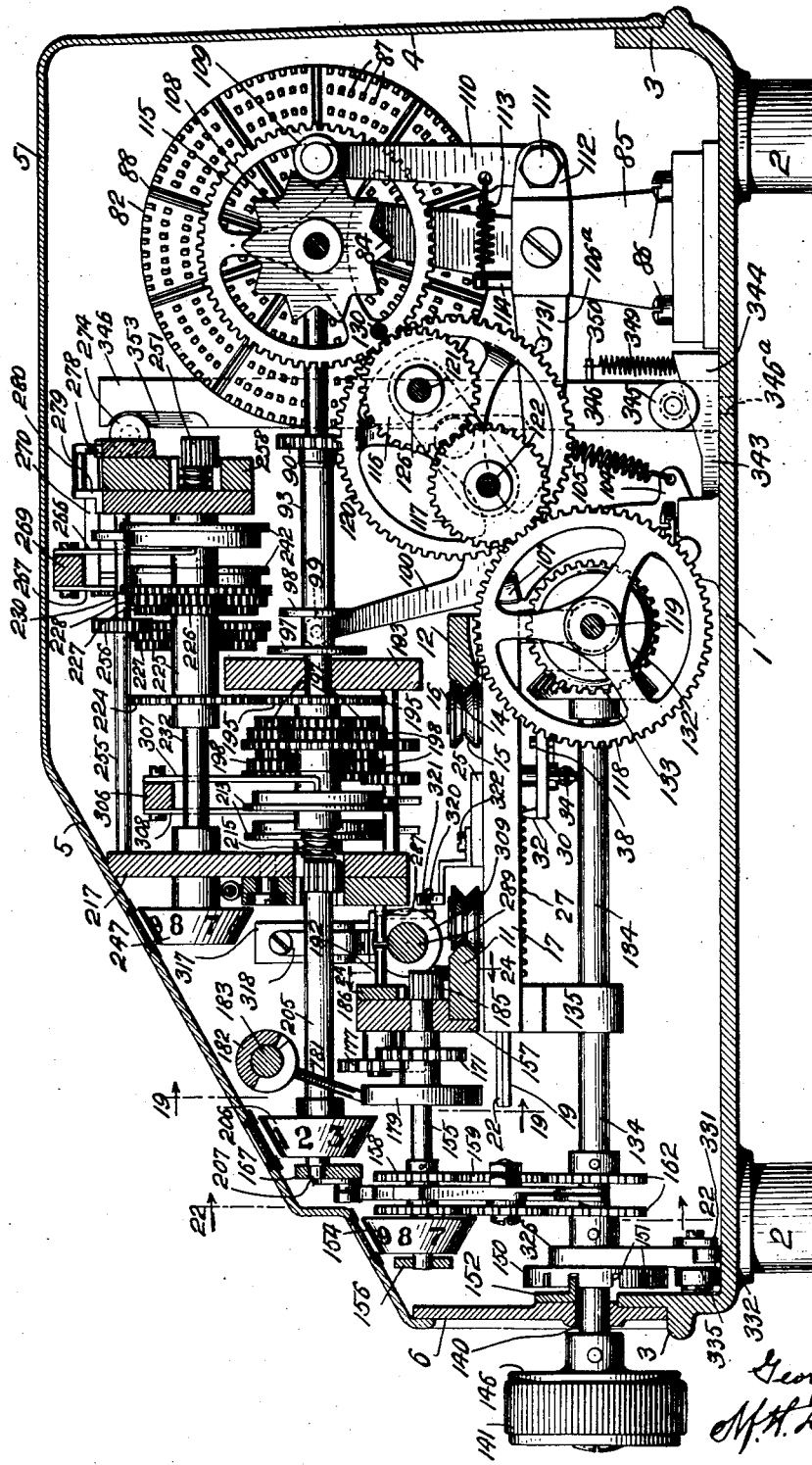

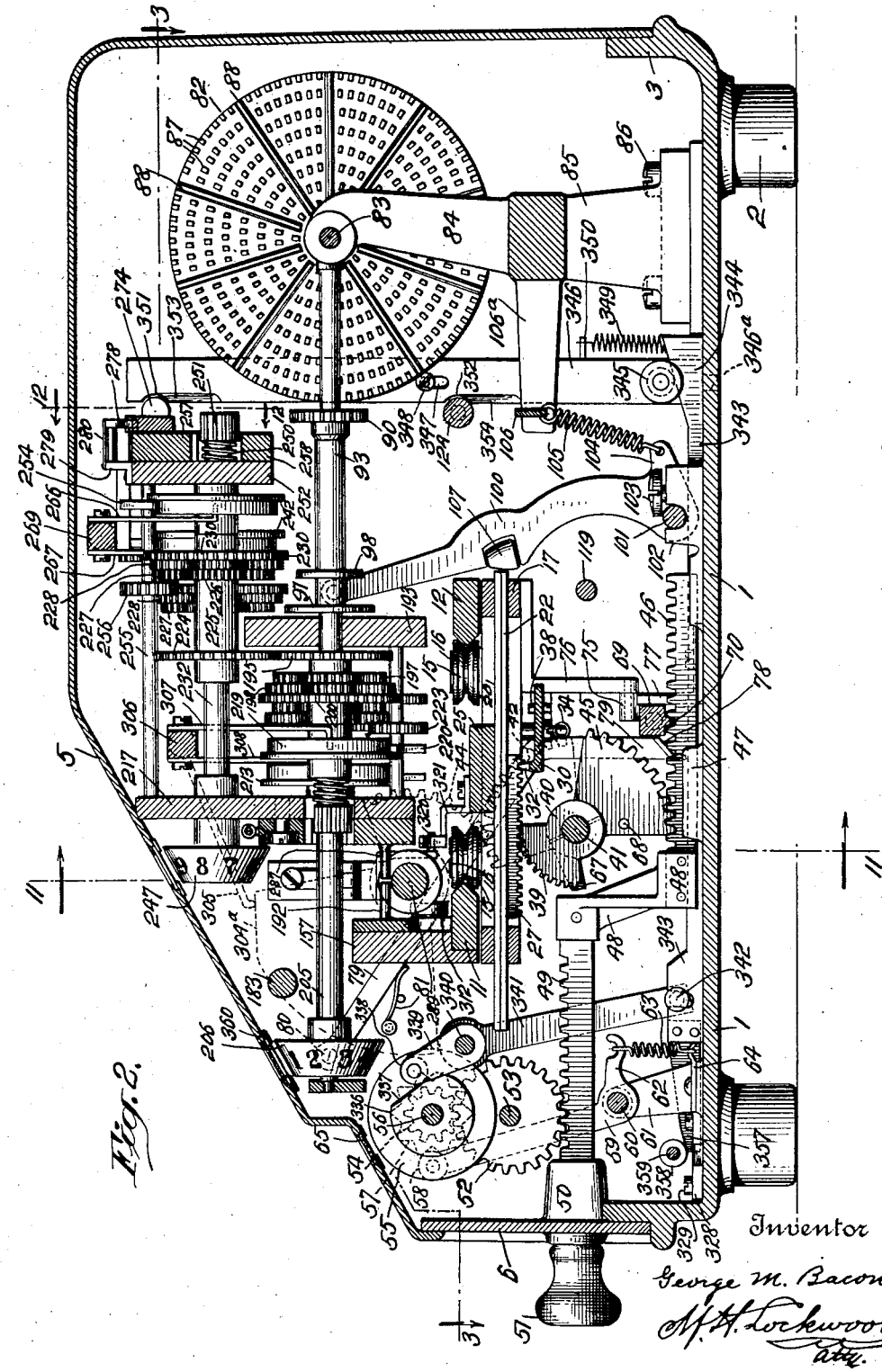

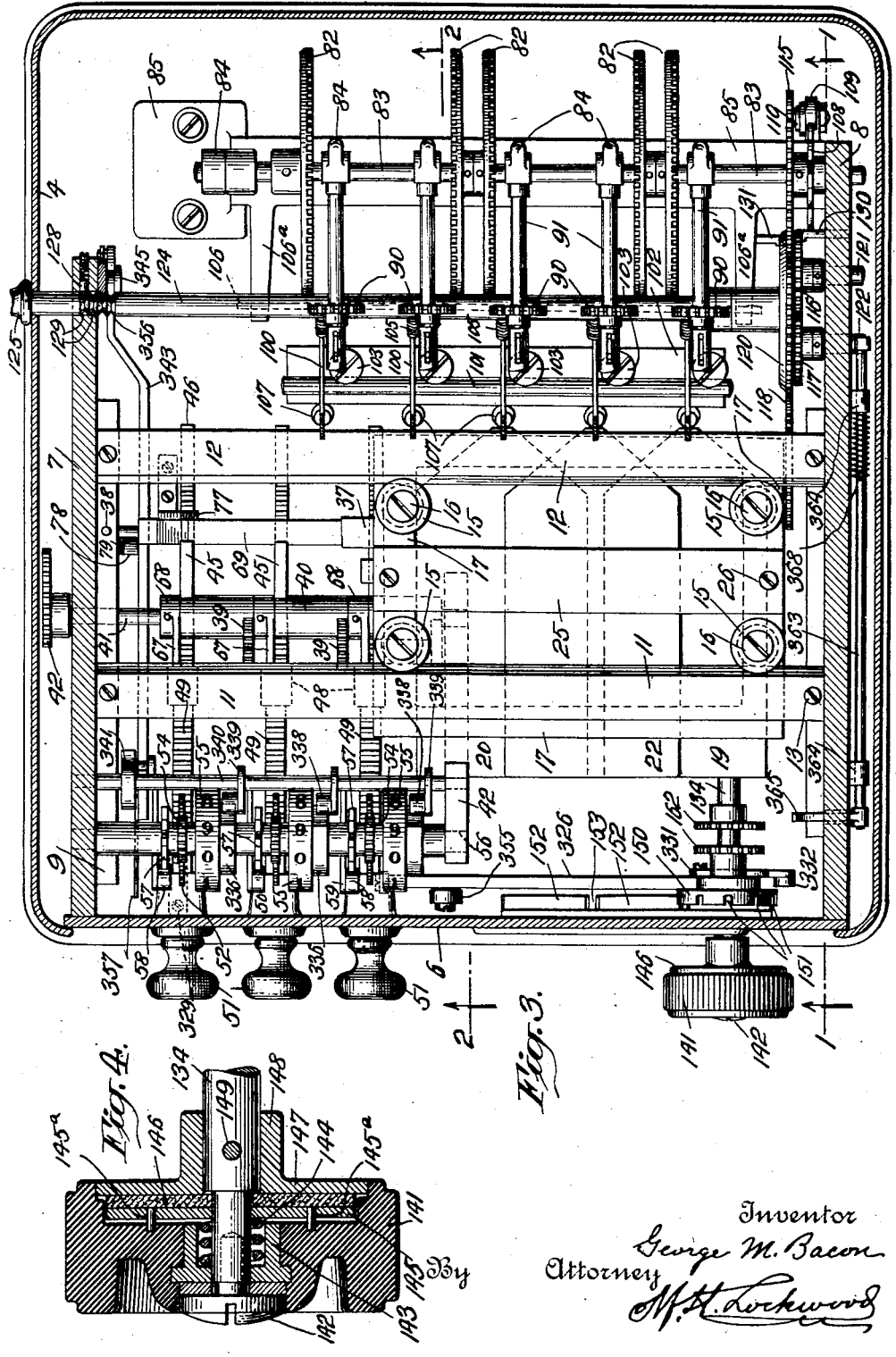

Sept. 16, 1924.　　　　　　　　　　　　　　　　　　1,508,762
G. M. BACON
MULTIPLYING MACHINE
Filed Dec. 8, 1920　　　12 Sheets-Sheet 4

INVENTOR
George M. Bacon
BY
M. H. Lockwood
ATTORNEY

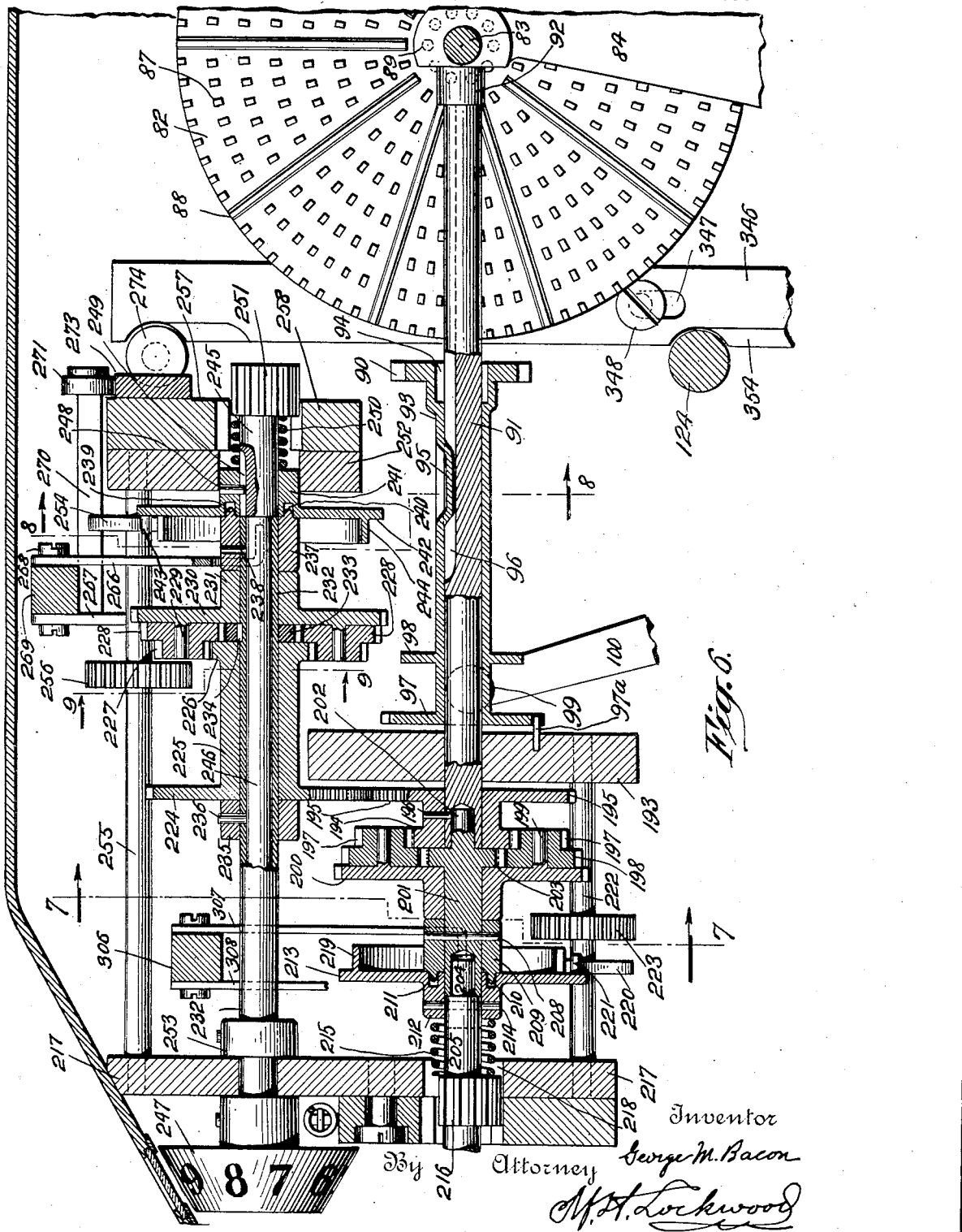

Sept. 16, 1924.                                             1,508,762
                        G. M. BACON
                    MULTIPLYING MACHINE
                    Filed Dec. 8, 1920          12 Sheets-Sheet 6

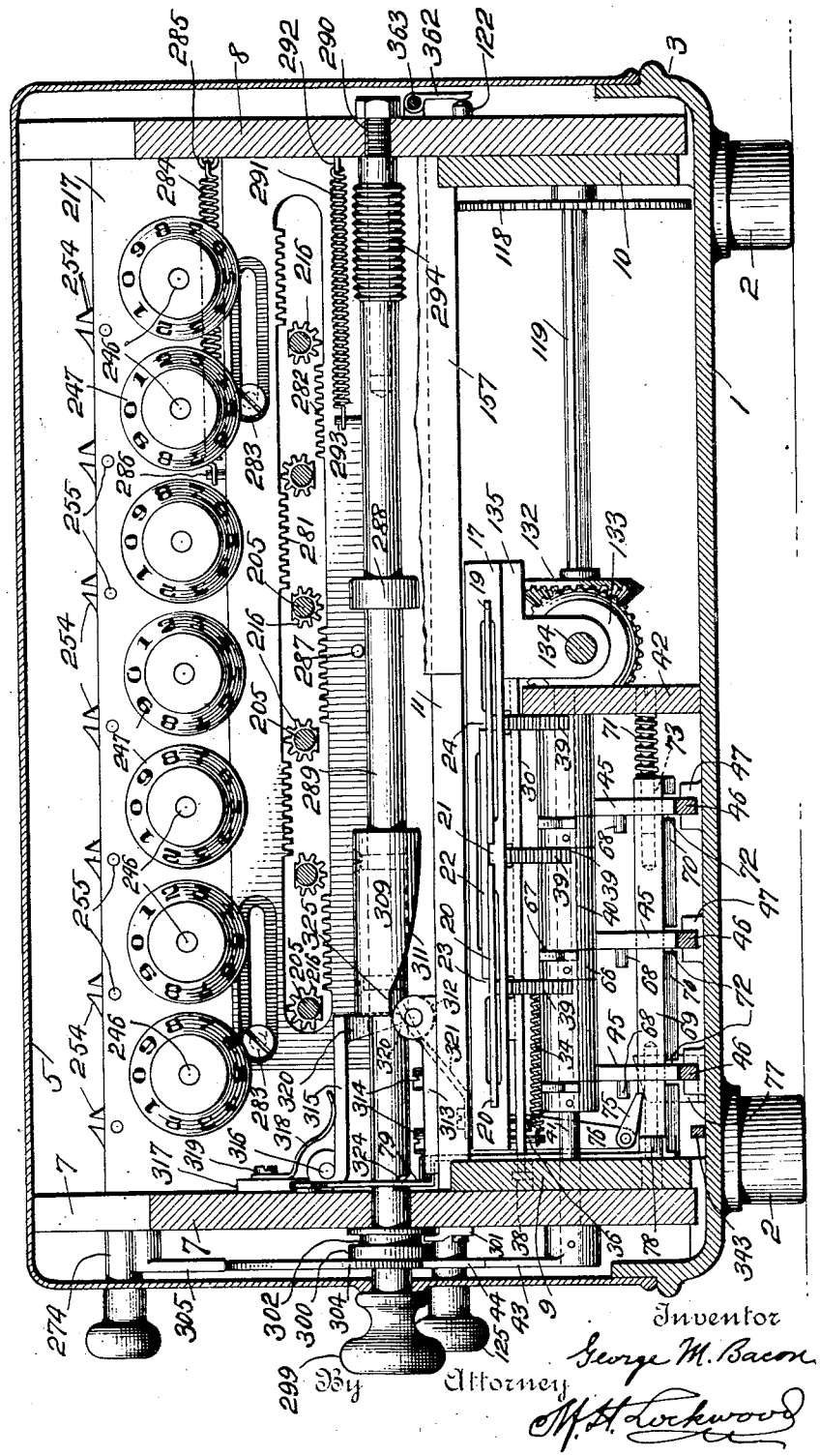

Sept. 16, 1924.  1,508,762
G. M. BACON
MULTIPLYING MACHINE
Filed Dec. 8, 1920   12 Sheets-Sheet 8
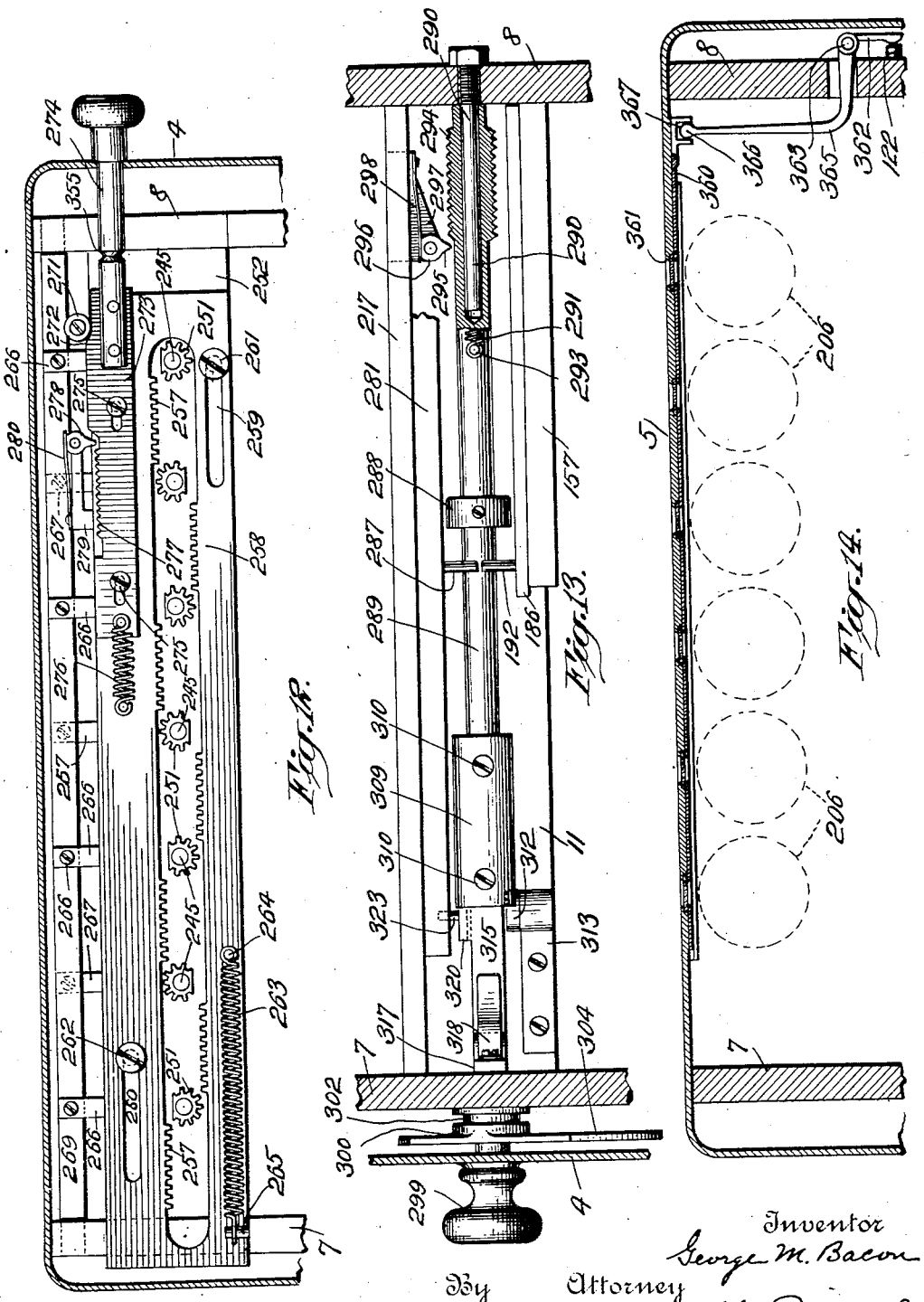
Inventor
George M. Bacon
By
Attorney
M. H. Lockwood Sept. 16, 1924.                                                1,508,762
G. M. BACON
MULTIPLYING MACHINE
Filed Dec. 8, 1920        12 Sheets-Sheet 9
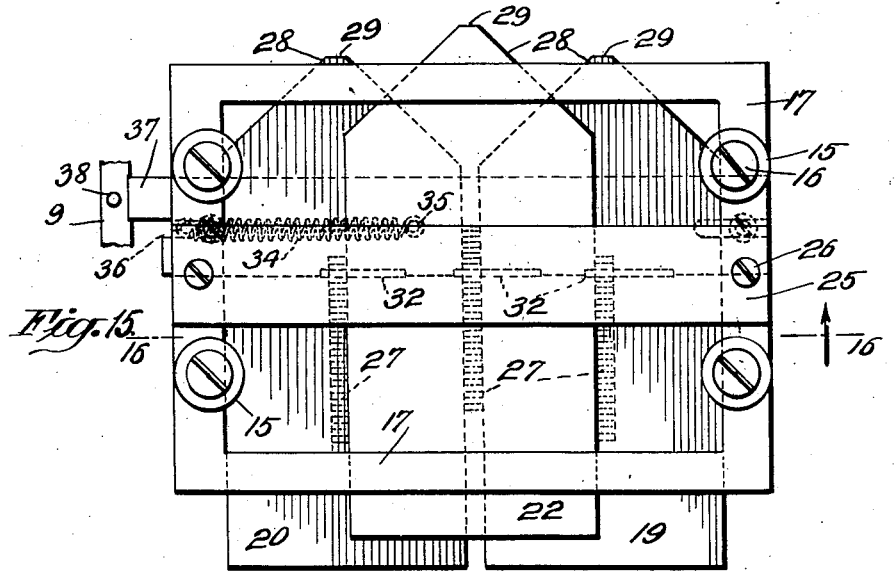
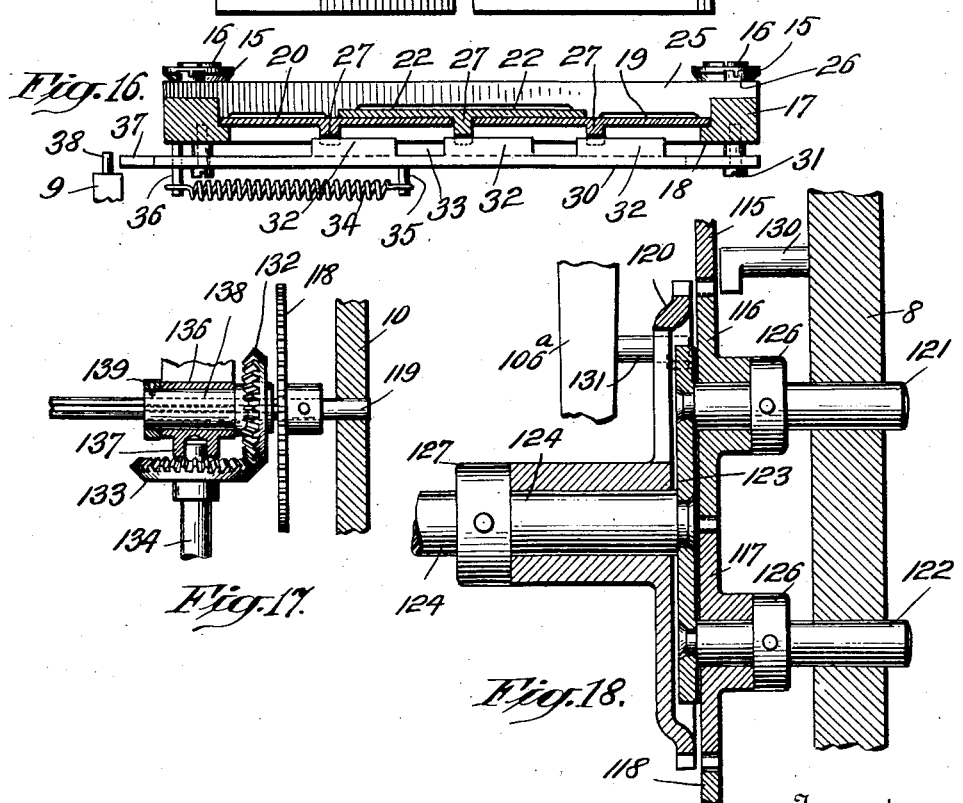
Inventor
George M. Bacon
By Attorney
W. H. Lockwood

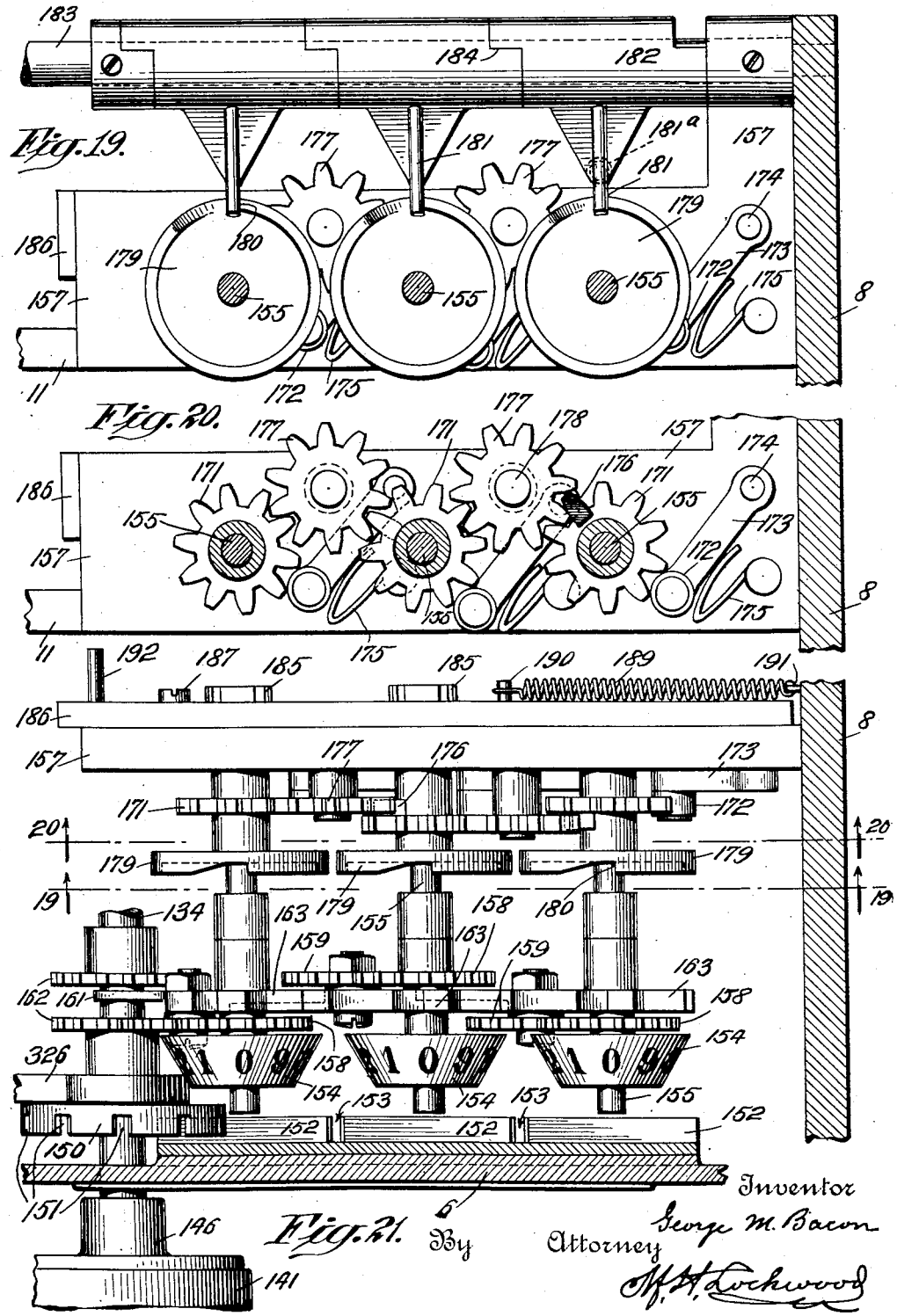

Sept. 16, 1924.    1,508,762
G. M. BACON
MULTIPLYING MACHINE
Filed Dec. 8, 1920    12 Sheets-Sheet 11

Inventor
George M. Bacon
By Attorney
M. H. Lockwood

Sept. 16, 1924.                                                1,508,762
G. M. BACON
MULTIPLYING MACHINE
Filed Dec. 8, 1920                    12 Sheets-Sheet 12
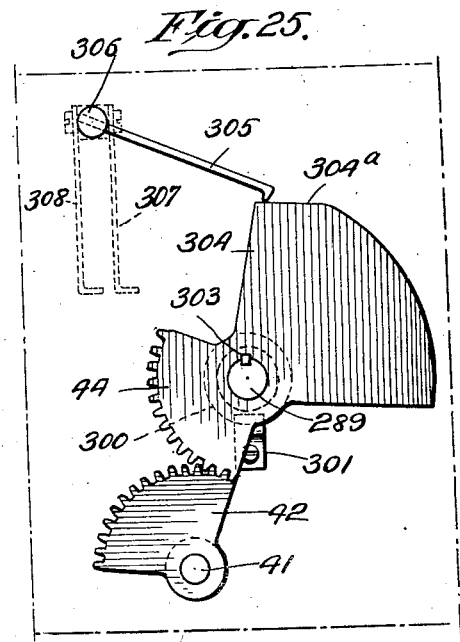
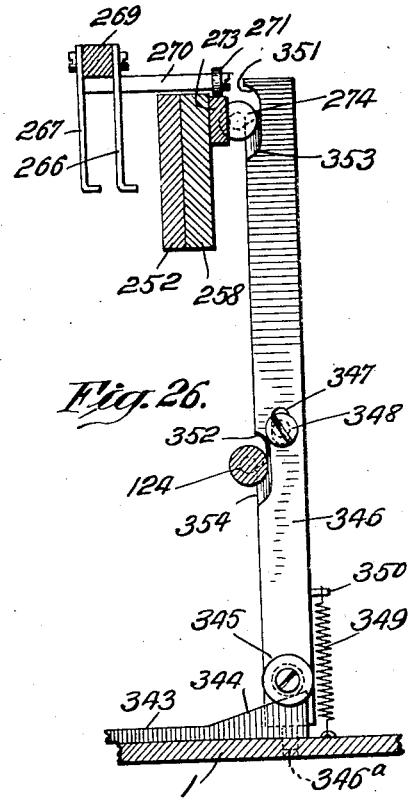
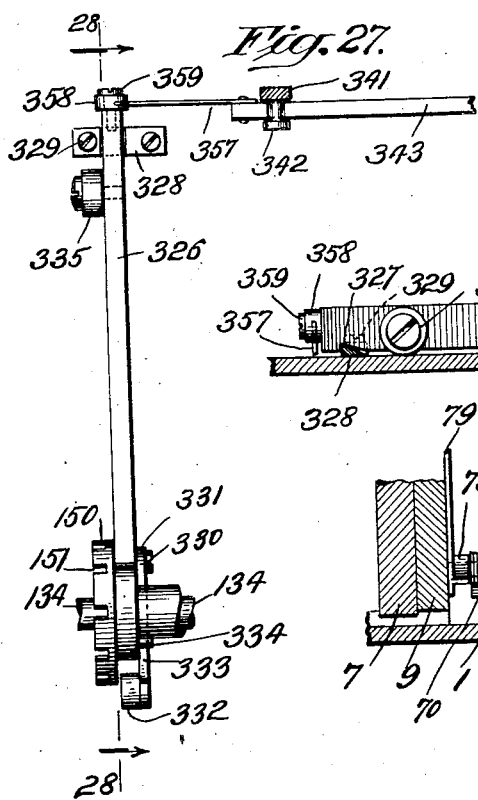
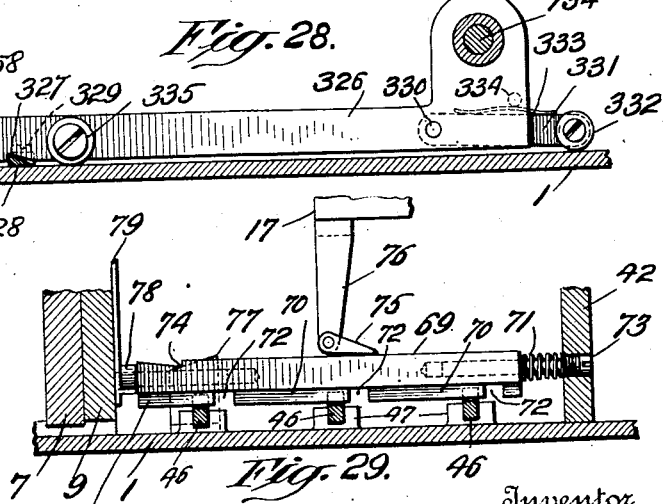
Inventor
George M. Bacon
By   Attorney
M. H. Lockwood Patented Sept. 16, 1924.

1,508,762

UNITED STATES PATENT OFFICE.

GEORGE M. BACON, OF SALT LAKE CITY, UTAH, ASSIGNOR TO BACON MULTIPLIER, INCORPORATED, OF SALT LAKE CITY, UTAH, A CORPORATION OF UTAH.

MULTIPLYING MACHINE.

Application filed December 8, 1920. Serial No. 429,107.

*To all whom it may concern:*

Be it known that I, GEORGE M. BACON, a citizen of the United States, and a resident of Salt Lake City, county of Salt Lake, and State of Utah, have invented certain new and useful Improvements in Multiplying Machines, of which the following is a specification.

My invention relates more particularly to a multiplying machine in which the product is obtained by the direct action of setting up the multiplicand and multiplier.

In developing my improved machine, the desire has been to eliminate unnecessary parts as far as possible and to construct a machine which, on account of its simple and direct action, can be readily operated by the inexperienced operator. In my machine the construction is such that there are no keys to confuse the operator and the various sight openings disclose only the multiplicand, multiplier and the product thereof.

The object of my improvement is to devise a machine in which the mechanical arrangement is such that the multiplicand is first set up and properly indicated at the multiplicand sight openings, and then the multiplier is set up by means of a knob which may be moved to different denominational positions of the multiplier and rotated to indicate at the multiplier sight openings the corresponding digits of the multiplier, the construction being such that the mere act of setting up and indicating the multiplier digits mechanically performs a multiplication and brings to the product sight openings the corresponding product of the multiplicand and multiplier.

A further object is to devise a machine in which multiplication is accomplished by providing a plurality of differential wheels mounted on the same axis for simultaneous rotation and adapted to be rotated by the multiplier knob in different denominational positions of the multiplier. It is further provided that in setting up the multiplicand, cam plates or members, for positioning pinions for cooperation with the differential wheels are positioned in a carriage, which is connected with and movable transversely of the machine by means of the multiplier knob. When the carriage is positioned denominationally of the multiplier by means of the multiplier knob, the cam members, set in accordance with the multiplicand, are adapted to position the pinions cooperated with the differential wheels in groups, corresponding to the number of digits in the multiplicand; the number of groups that may thus be positioned corresponding with the number of denominational positions of the multiplier.

In machines of this character, it is desirable, at times, to obtain the total of a number of consecutive multiplications and therefore, as a further object, I preferably provide total product dials operatively connected with the differential wheel pinions and adapted to be cleared independently of the product dials, so that repeated multiplications may be accumulated and totalized when desired.

As a further object, it is desirable that machines of this character may be used for problems of division and therefore, in my present machine it is arranged that division may be performed by simply reversing the direction of rotation of the differential wheels, without changing the direction of rotation of the multiplier knob or the indications of the multiplier dials, the latter in this case, being adapted to indicate the quotient. In division, as will be explained later, the dividend is set up on the total product dials and the divisor on the multiplicand dials.

As a further important object, in developing my improved machine, the effort has been made to construct a machine, which can be operated without liklihood of error, and which when operated, must be operated correctly to give the correct result. Therefore, to accomplish this, I have embodied in the machine many safety devices and locking mechanisms for absolutely controlling the operation of the machine in such a manner that it cannot be played with or juggled to inadvertently show or produce a wrong result.

With this object in view, mechanisms and locking devices are arranged so that the product dials as well as the multiplicand and multiplier dials can be cleared or returned to zero, only when the carriage is in the so called "neutral" position. It is also arranged that after setting up a multiplicand and moving the carriage by means of the multiplier knob, out of neutral position to denominational positions of the multiplier, the multiplicand setting devices and dials are locked and cannot be reset until the carriage is brought back to neutral position and then only by operating the clearing pull and thereby clearing the machine completely. It is also arranged that after returning the carriage to neutral position, it cannot again be moved out of neutral position until the clearing pull has been operated and a new number set up by the multiplicand mechanisms.

A further object is to provide locking devices for preventing operation of the clearing pulls, except under predetermined conditions. For instance, the total products dials cannot be cleared, unless the machine has been cleared by returning the product, multiplicand and multiplier dials to zero.

A further object is to provide for insuring the proper operation of the machine for division, a locking device being preferably provided for preventing operation of the reversing pull, when the machine is used for multiplication or when there is a number set up on the multiplicand dials. Provision is also made for obstructing the view of the product dials, when the division pull is operated, the shutter for this purpose preferably indicating to the operator that the machine is adjusted for division and should be operated accordingly.

Another important object of my improvement is to be found in the arrangement of the tens transfer and transmission gear mechanism between the differential wheels and the product dials, which mechanism permits disconnecting the product dials from the gear mechanism, so that the dials may be returned to zero or cleared, without disturbing the transmission mechanism. The mechanism for the total products dials, including the gear transmission and transfer mechanisms, is substantially similar to that of the product dials and both are driven by the same pinion connections with the differential wheels and therefore, because of the arrangement just mentioned, either set of dials may be returned to zero without interfering or affecting the mechanisms and connections of the other set of dials.

It is considered that the transmission gear mechanism, including the geneva gears for transfer of the tens, between the pinions driven by the differential wheels and the respective product dials, is particularly novel and simple and direct in operation.

Figure 22:
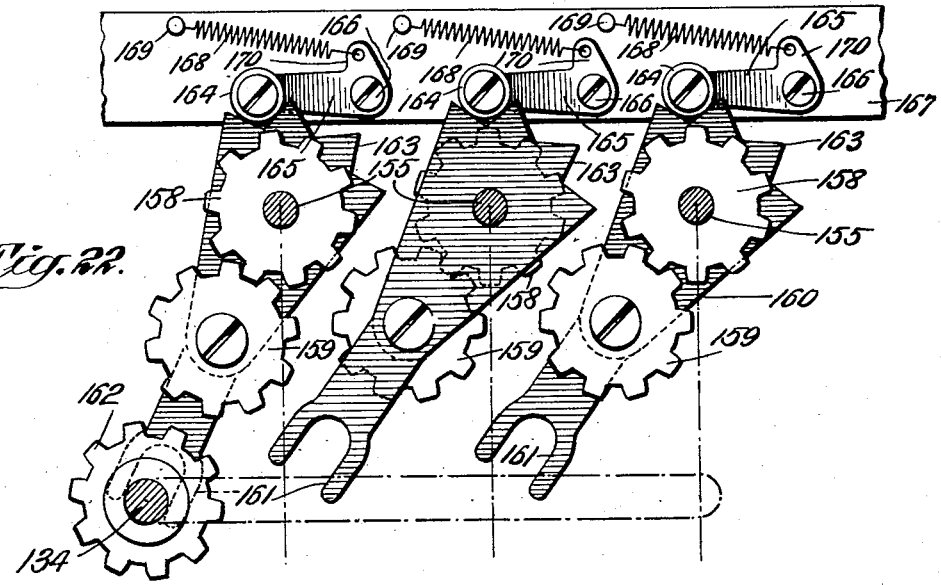
Figure 23:
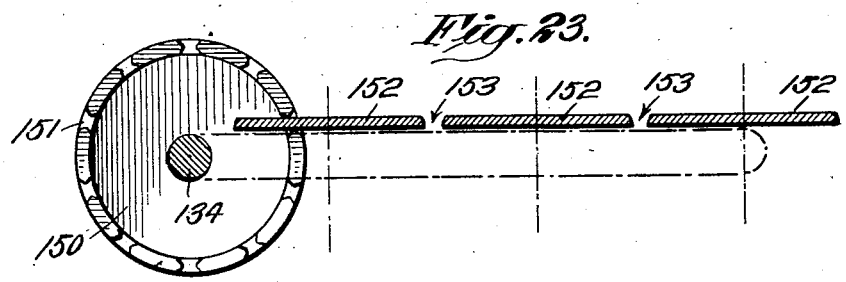
Figure 24:
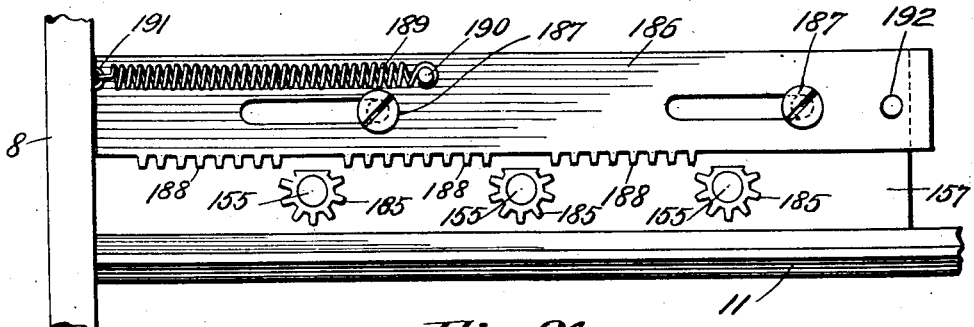

Various other improved mechanisms and devices will be found in my machine, one form of which is more particularly shown in the accompanying drawings, in which Fig. 1 represents a side elevation in section with the right side of the machine removed along the line 1—1 of Fig. 3; Fig. 2 is another sectional view, in side elevation along the lines 2—2 of Fig. 3; Fig. 3 is a plan view, the upper portion of the mechanism being removed along the line 3—3 of Fig. 2, the carriage being shown to the right out of neutral position, in order not to obstruct the view of the multiplicand setting up devices; Fig. 4 is a sectional detailed view of the multiplier knob; Fig. 5 is a plan view of the product and total product dials and their gearing connections; Fig. 6 represents a vertical front to back section through the transmission and transfer gearing for both product and total product dials; Fig. 7 shows a front view of the transmission gearing for the product and total product dials, the view being taken along the section line 7—7 of Fig. 6; Fig. 8 shows details of the Geneva gears, the view being taken along the line 8—8 of Fig. 6; Fig. 9 is a view of one set of transmission gears as viewed on the line 9—9 of Fig. 6; Fig. 10 is a view of one of the Geneva discs as shown in Fig. 8, showing the fork for moving the disc to open the clutch; Fig. 11 is a front elevation in section along the line 11—11 of Fig. 2; Fig. 12 is a rear view of the total product resetting pull as seen on the line 12—12 of Fig. 2; Fig. 13 is a broken away detail view of the clearing pull-rod for the product dials; Fig. 14 is a sectional view of the casing along the product dials sight openings to illustrate the shutter for closing the sight openings when the machine is used for division; Fig. 15 is a detail plan view of the reciprocating carriage; Fig. 16 is a cross-section of the carriage taken along the line 16—16 of Fig. 15; Fig. 17 is a detail view partially in section, of the gearing connection between the multiplier knob and the differential wheels; Fig. 18 is a sectional view of the intermediate gearing for the differential wheels showing the reversing gears for changing the direction of rotation for division; Fig. 19 is an enlarged detail view of parts associated with the multiplier dials, the view being taken along the line 19—19 of Figs. 1 and 21; Fig. 20 is a sectional elevation of parts associated with the multiplier dial, the section being taken along the line 20—20 of Fig. 21; Fig. 21 is an enlarged plan view of the multiplier dials and associated parts; Fig. 22 is an enlarged front detail view of the gearing for connecting the multiplier dials with the multiplier knob and shaft on the reciprocating carriage, the section being taken along the line 22—22 of Fig. 1; Fig. 23 is a sectional detail of the locking device for locking the multiplier knob against rotation except in denominational position of the multiplier; Fig. 24 is a rear view of the clearing mechanism for the multiplier dials, the view being taken along the lines 24—24 of Fig. 1; Fig. 25 is a detail view of the mechanism connected with the products clearing pull; Fig. 26 is an enlarged detail of the locking bar for locking the division pull shaft and the total product clearing pull; Fig. 27 is a plan view of the locking device for locking the reciprocating carriage in neutral position; Fig. 28 is a front elevation of the locking device shown in Fig. 27 and Fig. 29 is a section showing the details of the locking bar for the multiplicand setting members.

Referring to the drawings, it will be seen that my improved machine is mounted upon a base plate 1, provided with supporting feet 2 and having an upwardly projecting peripheral flange 3, extending thereabout over which the downwardly extending walls 4 of the top casing 5 are adapted to fit. The front wall of the casing 5 is open, the opening being closed by a wall 6, provided with holes through which project certain parts of the machine. The mechanism of the machine is mainly supported upon the base plate 1 and upon the side frame plates 7 and 8, as more particularly seen in Figs. 3 and 11 of the drawings.

The design of the machine is preferably such that various associated mechanisms may be assembled in units, so that they may be more readily assembled in the complete machine. For this reason, a pair of sub-frame plates 9 and 10 support certain of the mechanisms hereinafter described.

*Reciprocating carriages.*—Extending transversely of the machine and supported on the sub-frame plates 9 and 10 are two rails 11 and 12 (see Figs. 1, 3 and 11), the rails being secured to the respective side plates by means of screws 13, as indicated more particularly in Fig. 3 of the drawings. The rails 11 and 12 are preferably provided with double beveled edges at 14, which are adapted to form tracks for V-shaped anti-friction rolls 15, secured by screws 16, to the carriage frame 17, which is thereby adapted for reciprocating movement transversely of the machine. The carriage frame 17 (see Fig. 15) is preferably formed as an open rectangle, the end bars of which, at 18, are provided with inwardly extending flanges forming the slide-way for cam-plates 19 and 20. The other sides of the carriage frame are preferably slotted, as indicated in Fig. 11 of the drawings, and provided with lugs or shoulders 21, forming the inner slide-way or support, for the cam plates, 19 and 20. The carriage 17 also supports a third cam plate 22, overlapping the cam plates 19 and 20, and slidably held in place by depending lugs 23 and 24. A cover plate 25 is provided with similar lugs for positioning and slidably holding the cam plates in position, as indicated in Fig. 16 of the drawings, which is secured by screws 26 to the carriage frame 17. The undersides of each of the cam plates 19, 20 and 22 may be provided with a longitudinally extending gear rack 27, adapted to cooperate with corresponding segments of gears, as hereinafter described.

The rear ends of the cam plates 19, 20 and 22 are beveled off as indicated in Fig. 15 of the drawings, to form double cam faces 28, the point being left flat at 29, to form a dwell, the cams and dwells cooperating, as hereinafter described, with friction rollers (107) for positioning the multiplying elements in accordance with the digits of the multiplicand.

In order to hold the cam plates in adjusted positions, a locking member is provided and preferably mounted upon the carriage 17. In the present instance, this comprises a slide plate 30, mounted upon the under-side of the carriage frame 17, by screws 31, the screws passing through elongated slots, so as to permit longitudinal movement of the locking plate, the construction being best shown in Figs. 15 and 16 of the drawings. The upper face of the slide 30 may be provided with one or more rack teeth 32, extending transversely of the racks 27, on the cam plates 19, 20 and 22, and adapted to lock the same against movement by engagement therewith. The longitudinal extending locking teeth 32 of the locking plate are cut away at 33 so that when the plate 30 is pushed to the extreme right, as shown in Fig. 11, the slots 33 will lie below the respective racks 27, thereby permitting the latter and the corresponding cam slides to move for resetting the same as hereinafter described. The slide plate 30 is shown in locking position in Fig. 16. A spring 34 is preferably provided, and attached at 35 to the slide 30 and to a pin 36, projecting from the under-side of the carriage frame 17, the arrangement being such that the slide 30 will normally be held toward the left or in position for locking the cam plates. It is desirable that the cam plates remain locked, at all times, except when in neutral position at the extreme left side of the machine or in the position indicated in Fig. 11 of the drawings. In order to unlock the cam plates in neutral position, the locking plate 30 is provided with a short extension or lug 37 at the left end thereof, adapted to engage a pin 38, projecting upward from the sub-frame plate 9, the lug and pin being adapted to engage when the carriage is at the extreme left end of its run, so as to push the locking plate 30 to the right and hold it in the position indicated in Fig. 11 of the drawings, in which position it will be seen the cam plates will be free to move from front to back of the machine.

*Multiplicand setting-up mechanism.*—As previously indicated, the cam plates 19, 20 and 22 are unlocked and adapted to be positioned in accordance with the respective multiplicand digits, only when the carriage 17 is in its left hand position, which is preferably called the neutral position, as shown in Fig. 11 of the drawings, and in this position the racks 27 of the respective cams are adapted to engage gear segments 39, each provided with hubs 40, and mounted for rotation upon the transversely extending shaft 41, the latter being pivotally mounted in a centrally located frame plate 42, and the sub-frame plate 9 and side plate 7. The shaft 41 preferably extends through the plates 7 and 9, to the out-side of the frame plate 7 and has secured to the end a gear segment 43, meshing with a segment 44, adapted to be operated, as hereinafter described, by the pull for restoring the multiplicand members and dials and other dials to zero. Each of the hubs 40 is preferably provided with a downwardly extending segment 45, secured thereto and adapted to mesh with a rack 46, slidably mounted along the bottom of the machine in suitable slots in lugs 47, as indicated in Fig. 2 of the drawings. In the present machine three racks 46 are required.

The racks 46 are preferably connected by short upright brackets 48, with other racks 49, adapted to pass through holes in bosses 50, on the front plate 6 of the case and, extending beyond the latter, are provided with pull knobs 51, whereby the racks 46—49, may be drawn out for positioning the respective cam plates 19, 20 and 22, by moving them rearward of the machine when the carriage 17 is in neutral position (see Figs. 2 and 11).

For indicating the multiplicand digits and the setting of the multiplicand cams 19, 20 and 22, suitable dials are provided. The racks 49 may engage intermediate gears 52, rotatably mounted on the shaft 53, the gears being adapted to engage pinions 54, secured to the hubs of the multiplicand dials 55, as indicated in Figs. 2 and 3 of the drawings. The multiplicand dials 55 are preferably mounted for rotation upon a shaft 56, the latter, as well as the shaft 53, being supported in the sub-frame plate 9, and the central frame plate 42. Each of the dials 55 is preferably provided with a star wheel 57, secured to the hub thereof and rotated therewith. Detent rollers 58 are adapted to cooperate with the star wheels 57, the rollers being mounted upon the upper end of arms 59 pivoted on the shaft 60, the latter being supported in brackets 61, secured to the base plate 1 of the machine, as indicated in Fig. 2 of the drawings. Each of the detent arms 59 may be provided with a rearwardly extending lug 62, to which a spring 63 is attached, the opposite end of the spring being attached to a hook plate 64, the arrangement being such that the detent rollers 58 are resiliently held in engagement with the star wheels 57. The detents are arranged to properly position the dials, so that the proper numbers are visible through the windows or sight openings, 65, formed in the front lower step of the casing 5, as seen in Fig. 2 of the drawings.

As will be seen in Figs. 2 and 11 of the drawings, the gear segments 39—45 on the hubs 40 are supported on the shaft 41 by collars 66, each of which is provided with a forwardly extending arm 67, adapted, when the shaft 41 is rotated by the gears 43 and 44, to engage the pins 68, projecting laterally from the gear segments 45, as indicated in Fig. 11 of the drawings, thereby providing means for restoring the multiplicand dials and setting-up mechanisms to zero in the manner hereinafter described.

It has been explained that the gear segments 39 engage the corresponding racks 27 of the slide cams 19, 20 and 22, when the carriage 17 is in neutral position at the extreme left end of its run or in the position shown in Fig. 11 of the drawings, and it has been explained that when the carriage 17 is moved out of neutral position, the locking plate 30 thereon is adapted to lock the cam plates and hold them in set positions until the carriage is again returned to neutral position. It is, therefore, desirable that the multiplicand dials and pull-setting mechanism should be locked in positions corresponding to the set of the cam plates in the carriage 17 while the carriage is out of neutral position. For this purpose a transversely extending locking bar 69 may be mounted for sliding movement over the racks 46, as indicated in Figs. 2 and 11 of the drawings. The bar 69 is preferably provided with a tooth 70, adapted to engage the teeth of the racks 46, when the bar is in locking position. When the carriage 17 is in the position shown in Fig. 11 of the drawings, the bar 69 is held toward the left by a spring 71, so that notches 72 in the locking tooth 70 are over the respective racks 46, so that the latter may slide freely, for setting up the multiplicand and for setting the cam plates 19, 20 and 22, in the carriage 17. The bar 69, as indicated in Fig. 11 of the drawings, is supported on screws or pins 73, so as to slide thereon transversely of the racks 46, for locking the racks, the spring 71 holding the bar toward the left, or urging it to the left, when the bar is in locking position, as indicated in Fig. 29 of the drawings. The upper face of the bar, at 74, is provided with a notch or lug with which a pawl 75, pivotally mounted upon a depending arm 76 secured to the under-side of the carriage frame 17 is adapted to cooperate when the carriage is moved toward the right. The carriage when moved to the right may thus carry along with it, the locking bar 69, and thereby lock the racks 46, while the bar 30 by moving to the left on the carriage 17 simultaneously locks the cam slides 19, 20 and 22, by engaging the racks 27. The pawl 75 is adapted to be lifted out of the notch 74, when the bar 69 has been moved to the right a sufficient distance for locking the racks 46, by engaging a beveled lug 77, secured to the base of the machine and projecting upward to lie along the side of the bar 69, as indicated in Figs. 11 and 29 of the drawings. When the bar 69 has been moved over to locking position, the lower end 78 of a spring pressed arm 79 is adapted to pass back of the end of the bar, as indicated in Fig. 29 of the drawings, and prevent the return of the bar 69 under the pressure of its spring 71, until the carriage has been returned to neutral position and the resetting pull operated as hereinafter described. The arm 79 is preferably pivoted at 80 (dotted in Fig. 2), to the side plate 7, as indicated in Figs. 2 and 11 of the drawings, and is urged upward and backward by the springs 81 (shown in Fig. 2).

*Multiplying elements.*—When the carriage 17 is moved out of neutral position and to different denominational positions of the multiplier, the cam plates 19, 20 and 22, after being set in accordance with digits of the multiplicand, are adapted to cooperate with multiplying elements operating in accordance with the digits of the multiplier, to give the corresponding products. In the present machine, there is preferably provided a plurality of differential wheels 82, (five for a machine of the capacity shown) mounted upon and secured to a transversely extending shaft 83, rotatably supported in bracket arms 84, extending upward from a bracket 85, mounted in the rear of the machine and secured by screws 86, to the base thereof, the right hand end of the shaft 83 being preferably supported in the rear end of the frame side plate 8, as indicated in Fig. 3 of the drawings. The differential wheels 82 preferably comprise concentric circles of crown teeth 87, arranged in ten segments or groups, the groups being defined by radially extended continuous teeth 88, as indicated in Figs. 2 and 6 of the drawings. The number of teeth in the segments extending from the center to the circumference and set off by the continuous teeth 88, decrease in number from 9 in the outer circle to 1 in the inner circle. The inner circle of teeth may be preferably represented by pins 89, as indicated in Fig. 6 of the drawings, the pins 89 being in line with the ten continuous teeth 88.

A corresponding plurality (five in the machine shown) of pinions 90 are mounted on shafts 91 and are adapted to cooperate with the crown teeth 87—88—89 of the respective differential wheels, when the pinions are moved radially thereof, along the shafts 91. The shafts 91, as indicated in Fig. 6 of the drawings, are pivotally mounted at their rear ends in annular bosses 92, projecting forwardly from the upper ends of the bracket arms 84, the shafts being thus supported at right angles to the axis of and radially of the differential wheels. The bosses 92, as indicated, are preferably as near the diameter of the corresponding shafts 91 as possible in order that the pinions 90, which may be moved radially of the differential wheels, may be moved sufficiently close to the axis of the differential wheels to engage the pin teeth 89. To obtain the necessary strength and accomplish this, the pinions 90 are preferably mounted on tubular hubs 93, the rear ends being preferably spaced away from the shafts to form an annular socket 94, adapted to permit the pinions 90 to slide over the bosses 92, (see Fig. 6). The shafts 91 are adapted to operate the product dials in the manner hereinafter described, and each of the pinions 90 is keyed to the corresponding shaft 91, by a key 95 indicated as formed by indenting a portion of the tubular hub 93, the keys 95 operating in key slots 96, in the shafts 91, as indicated in Fig. 6 of the drawings. The tubular shafts 93, on the opposite ends from the pinions 90, are preferably provided with annular flanges 97 and 98, forming annular grooves in which rollers 99 are adapted to operate, the rollers being rotatably mounted upon the upper ends of arms 100. The annular flanges 97 are preferably provided with teeth, as shown in Fig. 6 cooperating with a pin 97$^a$, projecting from the bearing plate 193, for positively holding the pinions 90 against rotation when they are out of mesh with the differential wheels 82. The arms 100, as seen in Fig. 2 of the drawings, are pivotally mounted upon a rod or shaft 101, secured in grooves in lugs 102, extending upward from the base plate 1 of the machine, the rod 101 being held in place by the heads of suitable screws 103, the lugs 102 being slotted so as to hold the arms 100 in proper spaced relation. The arms 100 are preferably provided with rearwardly extending lugs 104, to which suitable springs 105 are secured; the opposite ends of the springs being attached to a transversely extending bar 106, mounted upon and supported by arms 106$^a$, extending forwardly from the bracket 85 as shown in Fig. 2 of the drawings, thereby providing means for resiliently holding the arms 100 and, therefore, the pinions 90 normally out of engagement with the differential wheels, the springs being adapted to permit movement of the pinions 90 radially of the differential wheels when the arms 100 are moved toward the rear of the machine. The arms 100 are preferably provided with anti-friction rollers 107 adapted to cooperate with the rear cam faces 28, 29 of the cam plates 19, 20 and 22, when the latter have been positioned in accordance with the digits of the multiplicand as hereinbefore described, and the carriage 17 is moved. It will be seen that normally the pinions 90 are out of engagement with the respective differential wheels 82, but when the cam plates (19, 20 and 22) on the carriage 17, by contact with the rollers 107, move the arms 100 toward the rear, the corresponding pinions 90 slide radially of the respective differential wheels, along the continuous teeth 88, which are normally held parallel with the shafts 91, upon which the pinions are adapted to slide. The differential wheels 82, being all secured to the shaft 83, are simultaneously rotated an equal amount corresponding with the digital value of the multiplier. Therefore, the differential wheels 82 are rotated the angular distance between two continuous teeth 88 for each unit of rotation of the particular multiplier dial which, for the moment, is connected with the shaft 83 and thus the pinions 90 receive an amount of rotation equal to the product of the multiplicand digits and the multiplier digits, the former being represented by the number of teeth 87 between two continuous teeth 88 in the circles of teeth to which the respective pinions 90 have been positioned by the cam plates 19, 20 and 22, which, as previously explained, are set according to the digits of the multiplicand.

In order to position the differential wheels 82 with the continuous teeth 88 in proper alignment and hold them in that position, the end of the shaft 83 is preferably provided with a star wheel 108, secured to the shaft, as indicated in Figs. 1 and 3 of the drawings. Cooperating with the star wheel 108 is a detent roller 109 mounted on the upper end of an arm 110, pivoted at 111, to a rearwardly extending lug 112, forming part of the bracket 85, which, as previously described, is secured to the base 1 and supports the differential wheels. The detent roller 109 may be held in cooperative relation with the star wheel 108, by means of a spring 113, extending between the arm 110 and a pin 114, as indicated in Fig. 1 of the drawings.

The differential wheels 82 are preferably secured to the shaft 83 and adapted for simultaneous rotation, the shaft being preferably rotated by a gear 115 secured to the shaft at the right hand end thereof, as indicated in Figs. 1 and 3 of the drawings. The gear 115 may mesh with an intermediate gear or pinion 116, of the same size as and meshing with another gear 117, the latter in turn, meshing with a gear 118 secured to the end of a shaft 119, which is preferably mounted for rotation between the frame plates 10 and 42, as shown in Fig. 17 of the drawings, which shows the gears in position for division, at which time, as previously stated, it is necessary to reverse the direction of rotation of the differential wheels. Normally, for multiplication, in my present machine, I provide a second gear 120, in mesh with 115 (Fig. 3), of double the diameter of the gears 116 and 117 and mounted, as indicated in Figs. 3 and 18 of the drawings, for rotation, parallel with the gears 116 and 117. The gears 120, 116 and 117 are mounted for shifting movement transversely of their axes, so that when the larger gear 116 is brought into mesh with the gears 115 and 118, the direction of rotation of the differential wheels will be reversed for division when the shaft 119 is rotated.

The gears 116 and 117 are mounted upon stud shafts 121 and 122, secured to a plate 123, which at its center, is secured to a rod 124, extending transversely of the machine, as indicated in Fig. 3 of the drawings, the left hand end extending through the side of the casing 4 where it is provided with a pull knob 125, whereby the rod 124 and the stud shafts 121 and 122, together with the gears 116, 117 and 120 may be shifted bodily. The outer ends of the stud shafts 121 and 122 are slidably supported in the side plate 8 and each is provided with a collar 126, (Fig. 18) for holding the respective gears 116 and 117 in proper position with respect to the gear 120, which is held on the opposite side of the plate 123, by a collar 127 secured on the shaft 124 (see Fig. 18). In order to hold the pull rod 124 in one position or the other the rod at 129, (Fig. 3) is provided with annular notches or grooves adapted to cooperate with a detent 128.

For aligning the respective intermediate gears 120, 116—117, so that they will properly mesh when the pull rod 124 is shifted, I preferably provide studs or pins 130 and 131 having tooth shaped heads adapted to engage the respective gears 116 and 120. The stud 130, as will be seen in Fig. 18, extends from the side plate 8 and is adapted to cooperate with the pinion 116 when the latter is thrown out of mesh with the gear 115. The stud 131 extends laterally from the bracket arm 106$^a$ so that it is in position to cooperate with the teeth of the gear 120 when the latter is moved out of mesh with the gear 115, the latter position being shown in Fig. 18. The studs 130 and 131 are also indicated in Fig. 1 of the drawings.

It will be understood that when the shaft 119 is rotated, the differential wheels will be rotated through the intermediate gears in one direction or the other as described. The shaft 119 is preferably rotated by bevel gears, one of which 132 (see Figs. 1 and 11) is keyed to the shaft 119 and slidable longitudinally thereof. The bevel gear 132 meshes with a similar gear 133, secured to the rear end of a shaft 134, which is rotatably mounted in brackets 135 and 136, secured to and depending from the underside of the reciprocating carriage frame 17. The carriage 17 has been hereinbefore referred to as supporting the cam plates 19, 20 and 22, which, when the carriage is moved out of neutral position, are adapted to cooperate with the arms 100, for shifting the pinions 90 to correspondingly mesh with the respective differential wheels 82. The bracket 135 and the carriage 17 are best seen in Fig. 11 of the drawings, while Fig. 17 shows the bevel gear connections and the bracket 136 in section. The rear end of the shaft 134 is preferably turned down and adapted to find bearing in a boss 137 on the bracket 136. The hub 138 of the bevel gear 132, is preferably elongated and passes through the bracket 136, the end of the hub being provided with a collar 139, secured thereto so as to hold the bevel gear 132 in proper relation to the gear 133, so that both, with the shaft 134 may be transversely movable with the carriage 17.

The forward end of the shaft 134 preferably extends through a transverse slot or opening 140 in the front plate 6, as indicated in Fig. 1 of the drawings, and may be provided with a knob 141, whereby the shaft 134 may be rotated to rotate the differential wheels in different denominational positions of the multiplier.

Preferably the knob 141 is frictionally attached to the end of the shaft 134, so that the differential wheels may not be rotated by means of a sudden jerk or twist of the knob and also to avoid excessive strains on the mechanism should parts thereof be locked against operation. This construction is more particularly shown in Fig. 4 of the drawings, where it will be seen, that the knob 141 is held to the end of the shaft by a screw 142, the knob being hollowed out and provided with a thimble 143 in which a spring 144 is placed, the spring being adapted to thrust the knob 141 outward, while thrusting a plate or disc 145 (held by pins 145ª to rotate with the knob 141) against a piece of felt or other suitable material 146, the latter being in turn, held in frictional contact with a disc 147, secured by means of an integral hub 148 and pin 149 to the shaft 134. By this construction, it will be seen that when the resistance to rotation of the shaft 134 becomes excessive the knob 141 will be turned relatively thereto.

It is desirable that the differential wheels and hence the shaft 134 shall be rotated only in predetermined denominational positions of the multiplier and therefore, when the carriage 17 is at the extreme left end of its run or in neutral position, the shaft 134 is preferably locked against rotation by the knob 141. In order to lock the shaft 134 against rotation, except in denominational position, the forward end of the shaft, as shown in Figs. 1, 3 and 23, has secured thereto a flanged disc or wheel 150, provided with notches or slots 151 in the flange of the wheel adapted to cooperate with a transversely extending plate 152, the latter having notches 153, corresponding with the denominational positions of the multiplier, the arrangement being such that the shaft 134 cannot be rotated when in neutral position, as indicated in Fig. 23 of the drawings, nor in an intermediate position, but may be rotated if moved to the right to different denominational positions of the multiplier, so that the flange of the wheel 150 with the notches 151 coincides with the notches 153. In other words, the differential wheels may be rotated by the shaft 134 only in the three denominational positions of the multiplier as shown, but at any intermediate position or in neutral positions, the shaft is locked against rotation.

*Multiplier dials.*—For indicating the amount of rotation of the differential wheels, and for indicating the digits of the multiplier, suitable dials are preferably provided and adapted to be operated by the shaft 134. A plurality of multiplier dials 154 are, therefore, provided and mounted upon shafts 155, in denominational positions, directly over the corresponding denominational positions assumed by the shaft 134, when the carriage 17 is moved to position the pinions 90 in groups according to the multiplicand as previously described. The shafts 155 are pivoted at their front ends in a transversely extending plate 156, while their rear ends are pivoted in a plate 157, which may be mounted upon the front carriage track rail 11, as indicated in Fig. 1 of the drawings. A pinion 158 is preferably secured to each of the shafts 155, so that the shafts 155 and the dials 154 may be rotated thereby. Each of the pinions 158 meshes with an intermediate gear or pinion 159, as indicated in Figs. 1 and 22 of the drawings, the latter being rotatably mounted upon arms 160, pivotally mounted or suspended from the respective shafts 155. The lower ends of the arms 160 may be provided with forks 161 which are adapted to cooperate with the shaft 134, when the latter is moved transversely of the machine, to throw the intermediate gears 159 into mesh with a pinion or pinions 162 mounted upon and secured to the shaft 134, as shown in Figs. 1 and 22.

Obviously, only one of the multiplier dials 154 should be geared with the shaft 134 when the latter is rotated in denominational position and the arrangement of the swinging arms 160 is such that the fork 161 of one arm will be disengaged from the shaft 134 when the latter is moved out of one denominational position and the fork of the adjacent arm 160 will be engaged by the shaft 134 as the latter is moved into the next denominational position. When the shaft 134 is in denominational position, it is adapted to lie vertically below the corresponding shaft 155 of the multiplier dials, as indicated by the positions of the dotted lines, extending vertically through the shafts 155 in Figs. 22 and 23. For holding the respective arms 160 in either of the three positions, they may assume, the upper ends of the arms 160 are preferably notched at 163 for cooperation with detent rollers 164, mounted on the ends of arms 165 pivoted by screws 166 to a transversely extending supporting plate 167, as shown in Figs. 1 and 22 of the drawings. Suitable springs 168 are preferably connected between pins 169 and the heels 170 of the pawls, for maintaining the detent rollers in contact with the notches 163, of the arms 160.

It will be observed that when the shaft 134 is moved transversely of the machine to release one of the arms 160 and pick up the adjacent one, the forks 161, or lower ends of the arms 160 must pass one another and to permit this the arms may be preferably mounted in staggered relation with the gears or pinions 158 and 159 on alternate sides of the arms 160. When this is done, as shown, two similar pinions or gears 162 are preferably mounted on the shaft 134 and the forks of the arms 160 extend between the gears 162 as shown in Fig. 1 of the drawings.

In order that the multiplier dials may be retained in proper position to indicate the digits of the multiplier, and to have the intermediate pinions 159 properly engage with the pinions 162 on the shaft 134, suitable detents are preferably provided. A star wheel of the ordinary type may be used but as will be seen in Fig. 20 of the drawings, I preferably employ the spur gears or pinions 171, secured to and rotatable with the shafts 155, upon which the multiplier dials are mounted. Rollers 172 cooperate with the teeth of the pinions 171, the rollers being rotatably mounted upon arms 173, pivoted at 174 to the supporting plate 157 and provided with springs 175 for holding the detent rollers 172 in proper operative relations to the respective pinions 171. Under certain conditions, it may be found desirable to operate or rotate the multiplier dials more than nine spaces in one direction (normally from left to right) or at times to reverse the direction of rotation and yet have the dials indicate the proper multiplier. In order that this may be satisfactorily accomplished, transfer mechanisms between the multiplier dials are preferably provided. It will be seen from Fig. 20 of the drawings that the pinions 171 are provided with a single wide tooth 176 adapted to engage the teeth of intermediate pinions 177, rotatably mounted on studs 178 on the supporting plate 157, the pinions 177 being continuously in engagement with the respective pinions 171 to the left so that all of the shafts 155 will turn in the same direction whether turned directly by the shafts 134 or turned by the transfer teeth 176. By providing this transfer mechanism between the multiplier dials, it will be seen that the operator may turn the differential wheels to perform multiplication without moving the shaft 134 out of a single denominational position, the number of rotations of the shaft 134 and hence the correct digital values of the multiplier being indicated on the multiplier dials the tens being transferred at each complete rotation of the respective dials.

Suitable means may be provided for preventing reverse rotation of the respective multiplier dials, except as hereinafter explained, thereby requiring the operator to always rotate the knob 141 and the shaft 134 toward the right to set up the multiplier digits and rotate the differential wheels. For this purpose, any suitable ratchet or detent means may be employed but preferably, I mount discs 179 on the shafts 155, as shown, in Figs. 19 and 21 of the drawings, the discs 179 being provided with annular flanges, having notches 180 with which pawls or stops 181 are adapted to cooperate to prevent reverse, that is from right to left, rotation of the respective multiplier dials. As will be more particularly explained hereinafter, it is desirable at times to reverse the rotation of the multiplier dials and rotate one or more thereof backward past the zero point. In order that this may be accomplished the stop members or pawls 181 are preferably provided with hubs 182 and mounted upon a transversely extending shaft or rod 183, supported in the side frame plate 7 and 8 or otherwise as may be desired. By examining Fig. 19, it will be seen that the adjacent hubs 182 overlap at 184, so that when any multiplier dial to the right is rotated one space or more the corresponding pawl or stop 181 for that dial will be lifted and by means of the overlap 184 all of the pawls 181 to the right thereof will likewise be lifted so that the dials to the right of the one first operated, may be afterward rotated backward from zero position or toward the left as seen in Fig. 19 of the drawings. This operation may be particularly desirable as a short cut for multiplying by "98" or "99", for instance, for in that case the multiplier dial in the hundreds place may be turned toward the right to indicate the "1". The carriage 17 and shaft 134 should then be moved to units place and the shaft together with the differential wheels rotated one or two spaces toward the left, according to whether "99" or "98" is the multiplier. The multiplier dials will then indicate the correct number and the correct product will be shown on the product dials, the tens transfer mechanism of the multiplier dials and of the product dials being brought into operation as described. A spring 181$^a$ is preferably connected to the right hand stop member 181 to hold the stops in engagement with the discs 179 (see Fig. 19).

In order to restore the multiplier dials to zero as hereinafter described, the rear ends of the shafts 155 may be provided with mutilated pinions 185, secured thereto, at the rear of the partition plate 157, as will be seen in Figs. 1 and 24 of the drawings. Fig. 24 is a rear view and it will be seen that a mutilated rack 186 is provided with slots and mounted upon screws 187, for movement transversely of the shafts 155, so that the teeth 188 of the rack may engage any of the mutilated pinions 185 that have been rotated out of zero position and restore the same to zero. A spring 189 connected at 190 to the rack slide 186 and at 191 to the side wall 8 of the machine, is adapted to normally hold the mutilated racks in the position indicated in Fig. 24. A pin 192 extends rearwardly from one end of the rack 186 into position to be engaged by restoring elements hereinafter described.

*Product dials and transfer mechanism.*—Referring more particularly to Figs. 1, 2, 5 and 6, it will be seen that in the machine here illustrated, the differential wheels 82 are adapted to drive the shafts 91 when the pinions 90 are in engagement therewith, the particular circles of teeth engaged by the respective pinions depending upon the multiplicand digits, or more directly, the positions of the cams 19, 20 and 22, on the carriage 17, hereinbefore described. The shafts 91, as seen more particularly in Fig. 6, extend forward through a transversely extending bearing plate 193, and gears 194 and 195 are secured thereto in front of said plate 193, in any suitable manner as by the pin 196. The gears 195 are for transmitting the rotation of the shafts 91 to the total product dials as hereinafter described, while the gears 194 engage planetary pinions 197, secured to slightly larger pinions 198, of which there are preferably two sets, both sets of pinions (197—198) being rotatably mounted on studs 199, secured to and projecting from large gears 200. The gears 200 are rotatably mounted upon intermediate shafts 201, the rear ends of which are turned down at 202, and enter sockets formed in the forward ends of the shafts 91, as indicated in Fig. 6 of the drawings, the two sets of shafts being in axial alignment. The shafts 201 have, secured thereto, either integrally or otherwise, pinions or gears 203, meshing with the larger planetary pinions 198, which as previously pointed out are secured to the pinions 197. The forward ends of the shafts 201, are preferably bored out and engage the turned down ends 204 of the shafts 205, extending forward and upon which the product dials 206 are mounted for rotation therewith, as indicated in Fig. 1 of the drawings. The forward ends of the product dial shafts 205 are turned down at 207 and supported in a transversely extending strip 167, previously referred to and shown in Figs. 1, 2, 5 and 6. As will be seen in Fig. 6 of the drawings, the intermediate shafts 201 have, secured thereto, by the pins 208, collars 209, provided with clutch teeth 210, adapted to engage clutch sockets 211, in the hubs 212, of the large flanged single tooth members 213, of the Geneva gears for transferring the tens. The Geneva members 213 are secured against rotation with respect to the shafts 205 upon which they are mounted by means of the pins 214 but the pins 214 preferably pass through elongated slots in the shafts 205, so that the geneva members 213 may slide on the shafts to release or disengage the clutch members 210—213. Suitable springs 215 are preferably mounted upon the shafts 205 and press against the hubs 212 of the Geneva discs 213, to hold the clutch members in engagement the opposite ends of the springs 215 thrusting against suitable collars secured to the respective shafts, these being represented in the present instance by the mutilated pinions 216, secured to the shafts 205 and utilized as hereinafter described for restoring the product dials to zero. The shafts 205 extend through the partition plate 217, the holes 218 therethrough being preferably of sufficient size to serve as a bearing on the periphery of the respective pinions 216.

The flanges 219 of the Geneva wheels 213 cooperate with the curved surfaces of the four-point Geneva wheels 220, during $\frac{9}{10}$ of a rotation of the product dials, 206, on the shaft 205 and single teeth 221 on the disc members 213 cooperate with the slots in the Geneva wheels 220 to rotate the latter one step when the product dials pass from nine to zero, or zero to nine, according to the direction of rotation of the product dials. The Geneva wheels 220 are mounted upon and secured to shafts 222, pivotally mounted in the transverse partition plates 193 and 217, as seen in Figs. 1, 2 and 6 of the drawings, each of the shafts 222 being provided with a gear or pinion 223 meshing with the respective planetary gears 200, previously described as supporting the planetary pinions 197 and 198. It will be observed, more particularly, in Fig. 5 of the drawings, that planetary gears 200 and Geneva disc members 213 are mounted in staggered relation transversely of the machine in order that the respective parts may be made as large as possible and not interfere with each other, while, at the same time, permit mounting the product dials as close together as possible to reduce the width of the machine.

*Total-product dials.*— The gear mechanism of the total product dials, is substantially similar to that just described for the product dials. The gears 195 heretofore referred to as secured to the ends of the shafts 91, preferably mesh with gears 224, shown in Fig. 6 of the drawings as secured to hubs 225, the rear ends of which are provided with pinions 226, corresponding in size with the pinions or gears 194 and adapted to mesh with planetary pinions 227 secured to larger pinions 228, and rotatably supported upon studs 229, on the planetary gears 230, the latter being provided with hubs 231 and rotatably mounted upon the tubular shafts 232 upon which the gears 224 and 226 are rotatably mounted. The tubular shafts 232 are provided with pinions 233 secured thereto, by keys 234, between the gears 226 and the gears 230, as shown in Fig. 6 of the drawings, the pinions 233 being in mesh with the larger planetary pinions 228, the arrangement and proportions of the gearing being identical with that shown and described in connection with the product dials. The gears 224 and 226 on the hubs 225 are held in place for rotation on the tubular shafts 232 by suitable collars 235, pinned thereto by the pins 236. The rear ends of the tubular shafts 232 have, secured thereto, clutch collars 237, by the pins 238, the collars 237 being provided with clutch teeth 239 cooperating with holes 240 formed in the hubs 241 of the Geneva discs 242, forming the single tooth members of the Geneva transfer mechanism for the total product dials, the single tooth being represented by the pins 243 lying centrally of the cut-out portion of the flange 244, as indicated in Figs. 6 and 8 of the drawings.

The tubular shafts 232 end with the clutch collars 237 and the hubs 241 of the Geneva discs 242 are mounted upon the enlarged ends 245 of the shafts 246, to the forward ends of which the total product dials 247 are secured. The Geneva discs and the clutch hubs 241—242 are rotatable with the shafts 245—246, but are slidably mounted thereon by means of the pins 248 which slide in the longitudinal slots 249 of the shafts. The clutch members 239 and 241 are held in engagement by means of the springs 250, thrusting against the hubs 241, and collar-like mutilated pinions 251, the latter being adapted to cooperate with mutilated racks for resetting the total product dials to zero in the manner hereinafter described. The rear ends of the total product dial shafts are pivotally supported in the transversely extending supporting plate 252, while the forward ends are supported in the plate 217, as indicated in Fig. 6 of the drawings. Suitable collars 253 are secured to the forward ends of the tubular shafts 232 so as to position and hold the total product dial shafts in proper operative relations.

The flange 244 of the Geneva discs 242 cooperate with the curved surfaces of the Geneva wheels 254 mounted upon shafts 255, the latter being pivotally mounted between the partition plates 217 and 252 and carrying pinions 256 engaging the planetary gears 230, the adjacent gears and pinions being staggered as shown in Fig. 5 of the drawings.

The relation between the two sets of gear connections for the product and total product dials are best seen in Fig. 7 of the drawings, where the shafts 222 and pinions 223 are shown below the line of the product dial shafts 201, while the shafts 255 and pinions 256 are shown above the line of the total product shafts 232—246.

The large tooth planetary gears 200 and 230 constituting a part of the transfer mechanism for the product and total product dials respectively, are provided for all of the dials 206 and 247, but it will be understood that since there can be no transfer to the units dials, the 60-tooth gears 200 and 230 to the right, as indicated in Figs. 5 and 7, are held against rotation by suitable fingers or pins 200$^a$ and 230$^a$ which may extend from the side wall 8 of the machine frame to engage the teeth of the gears 200 and 230.

In Fig. 8, the relation between the transfer devices is indicated, the discs 242 shown being those of the total products dials the view being taken along the line 8—8 of Fig. 6. The shafts and pinions shown below the Geneva discs 242 and gears 254 are the shafts 91, and pinions 90, the latter of which, as previously explained, cooperate with the differential wheels 82 for rotating both the product and total product dials. The connection between the shafts 91 and the total product dials is through the gears 195 and 224, as previously pointed out, and shown in Fig. 6 of the drawings.

The gears 224, and hence the pinions 226 connected thereto by the hubs 225, of the two extra total product dials at the left are held against rotation by suitable pins 224$^a$ as shown in Fig. 5 of the drawings. The corresponding gear 195, while not being secured to one of the shafts 91 and provided with pinions 90, may be supported in the bearing partition strip 193, by a short shaft. Thus the gear 195 at the extreme left being in mesh with the gear 224 of the second extra total product dial from the left end will be held against rotation by the pin 224ᵃ, holding the gear 224.

A view of the intermediate planetary gearing connections is best shown in Fig. 9, of the drawings, which represents the gearing of the total product dials, but the same proportions are maintained for the product dials and the illustration will serve for both. In the gearing shown the gears 194 and 226 are provided with 24 teeth and mesh respectively with the pinions 197 and 227, the latter each having 12 teeth. The pinions 198 and 228, to which the pinions 197 and 227 are secured, are provided with 18 teeth. The pinions 198 and 228 mesh respectively with the pinions or gears 203 and 233 which are provided with 18 teeth and through the clutch members are adapted to rotate the respective product and total product dials. It will thus be seen that for each rotation of the driving shafts 91, the product dials will be rotated twice and the same will be true with respect to the total product dials.

*Resetting total product dials to zero.*—It has been pointed out that the clutch members 239, 240, 241, connected with the Geneva discs 242 are adapted to be disconnected by moving the discs 242, thereby permitting the total product dials to be rotated independently of the intermediate gearing connections. It will be observed that the flanges 244 of the discs 242 are wide enough to permit the opening of the clutches without the Geneva gears 254 getting out of engagement with the Geneva discs 242. When the clutches are disconnected the Geneva discs and the total product dials may be returned to zero by means of the mutilated pinions 251, which are adapted to be engaged by mutilated racks 257, and 258, on opposite sides of the shafts 245, 246, the racks cooperating with alternate pinions, as indicated in Fig. 12 of the drawings, which is a rear view. The mutilated racks 257 and 258 are here shown as secured together or formed as a single slide, provided with slots at 259 and 260, cooperating with screws 261 and 262, slidably securing the racks to the transverse partition plate 252. For holding the racks in and returning them to normal position, a spring 263 is secured at 264 to the slidable racks, the opposite end of the spring being held by a pin 265 in the side wall 7 of the machine frame.

Before the shafts 245 of the total product dials 247 may be rotated by the mutilated racks 257 and 258 for restoring the dials to zero, it is necessary to disconnect the dials by moving the disc clutches herein before referred to, and this may be preferably accomplished by the forks 266 and 267 secured by screws 268 to the bar 269, extending transversely of the machine and pivoted in the side plates 7 and 8 of the main frame of the machine as indicated in Fig. 12 of the drawings. In this manner, all of the clutch discs 242 are adapted to be moved simultaneously to break the total product dial clutches when the rock shaft or bar 269 is rocked. To rock the bar 269 for this purpose, there is preferably attached thereto a rearwardly extending rock arm 270 provided with a roller 271 adapted to cooperate with a cam lug at 272 on a supplemental slide plate 273, to which the clearing pull knob 274 is secured. The supplemental slide plate 273 may be attached by screws 275 to the slidable mutilated rack members 257—258, the screws 275 passing through elongated holes, so that the pull-knob 274 and cam 272 are given a preliminary movement sufficient to operate the roller 271, and thus rock the rock bar 269, and, through the forks 266 and 267, break the clutches, prior to moving the mutilated racks 257 and 258. A small spring 276 is attached between the slide 273 and the rack 257 for holding the supplemental slide 273 in retracted position as indicated in Fig. 12 of the drawings. The upper edge of the supplemental slide 273, as will be seen in Fig. 12 of the drawings, is preferably provided with a saw tooth rack 277 with which cooperates a double acting detent pawl 278, pivoted on an arm 279 secured to the plate 252, a spring 280 being provided to cooperate with the heel of the pawl 278, the pawl thereby being adapted to operate against the teeth of the rack 277 to compel a full stroke of the pull 274 in both directions.

*Resetting product, multiplicand, and multiplier dials.*—The product dials may be reset to zero by mechanisms substantially similar to the mechanism employed for resetting the total product dials to zero, but preferably the pull rod 289, for this purpose is adapted not only for resetting the product dials to zero but also for resetting or clearing the multiplicand and multiplier dials.

The product dials 206 are adapted to be released from the intermediate gear mechanism by moving the Geneva discs 213 to break the clutches 210—211 so that the product dials and Geneva discs may be rotated backward to zero independently of the total product dials or the shafts 91 as hereinbefore described. It has been pointed out that the shafts 205, to which the product dials 206 are secured, are provided with mutilated pinions 216, adapted to cooperate with oppositely disposed mutilated racks 281 and 282 (see Fig. 11) secured together and attached by screws 283, passing through elongated holes therein, to the transverse partition plate 217 as indicated in Figs. 6 and 11 of the drawings. The racks 281 and 282 are held out of engagement with the mutilated pinions by means of the spring 284 secured at 285 to the side wall 8 and to the mutilated rack member by the pin 286. A pin 287 projects from the rack member 282 in position to be engaged by a collar 288 secured to the transversely extending shaft or pull rod 289, which is slidably mounted in the frame of the machine, the right-hand end, as seen in Fig. 11 of the drawings, being slidably and rotatably supported upon the end of a bolt 290, threaded into the side wall 8, the end of the bolt extending into the bored-out end of the shaft 289, as indicated by dotted lines in Fig. 11 of the drawings. The pull rod 289 is preferably returned to or held in the position shown in Fig. 11 of the drawings by a spring 291 secured at 292 to the wall 8, the opposite end of the spring being secured by the pin 293 to the pull-rod 289. In order to provide a full stroke mechanism for the pull-rod 289, the right hand end, as seen in Figs. 11 and 13 of the drawings, is preferably provided with a plurality of annular notches 294, adapted to cooperate with a double acting pawl 295, pivoted at 296 to a bracket or lug 297 extending forwardly from the supporting plate 217, and held by a spring 298 to engage the annular teeth 294 in both the forward and return stroke of the rod 289 and compel the full stroke in either direction.

It has been previously described that the multiplier dials 154 are adapted to be returned to zero by means of mutilated pinions 185 cooperating with mutilated racks 188, as shown in Fig. 24 of the drawings, the rack bar 186 being shown as slidably mounted on a bracket support or plate 157 secured to the carriage track rail 11, as more particularly seen in Figs. 1 and 2 of the drawings. It was also pointed out that the rack bar 186, as shown in Fig. 13 of the drawings, is provided with a rearwardly extending pin 192 substantially in alignment with the pin 287, on the rack member 281—282, so that the collar 288 on the rod 289 is adapted to engage both pins 192 and 287, when the pull-rod is drawn toward the left from the position indicated in Fig. 13 of the drawings. In this manner both the product and the multiplier dials may be returned to zero positions by the operation of the pull rod 289 to which the pull knob 299 is secured, the pull-rod passing through the side plate 7 and the cover casing 4, as indicated in Figs. 11 and 13 of the drawings.

The pull rod 289, when drawn out to clear the product and multiplier dials, is also adapted to release the product dial clutches and restore the multiplicand dials and cam members to zero. It has previously been described that the multiplicand dials and the setting up pulls and the racks 46 are adapted to be restored to zero when the carriage 17 is in neutral position (indicated in Fig. 11), by engagement of the radial arms 67 with the pins 68, when the rock shaft 41 is rocked. It will be seen that the rock shaft 41 may be rocked or partially rotated by means of the segmenetal gear 43 (see Fig. 25), secured to the end of the shaft 41 and meshing with the gear segment 44, which, it will be seen from Fig. 11, is provided with a hub 300 and held in place by the finger bracket 301, the end of which engages an annular groove 302 in the hub 300. The pull rod 289, in the outer end thereof, is preferably provided with a key-way in which a key 303 as seen in Fig. 25 of the drawings is adapted to cooperate in a manner to permit the pull-rod to be drawn out and rotated to thereby rotate the segments 43 and 44 and hence restore the multiplicand dials 55 to zero in the manner described.

A cam 304 is preferably secured to the hub 300, substantially as indicated in Fig. 25, and the edge thereof is adapted to cooperate with a rock arm 305 secured to the end of a rock bar 306, which resembles the rock bar 269 and is likewise provided with depending forks 307 and 308, similar to the forks 266 and 267, adapted to cooperate with the discs 213, to slide the same and release the clutches 210—211, substantially as indicated in Figs. 2, 6, and 25 of the drawings. The cam disc 304 is preferably flattened at 304$^a$ one corner being cut off as indicated in Fig. 25, so that the arm 305 which rests thereon normally, may be lifted and the shaft 306 rocked when the cam disc is rotated by pulling out the clearing bar 289.

It will be understood that it is preferable to rotate the pull-rod 289, to restore the multiplicand dials to zero and disconnect the product dials by breaking the clutches 210—211, before the collar 288 (see Fig. 13) engages and picks up the pins 192 and 287 for restoring respectively the multiplier dials and the product dials. For this reason, it will be seen that the collar 288 is spaced from the pins (192—287), in the normal, inoperative position indicated in Fig. 13. In order to rotate the pull-rod 289, the desired amount, and thereby rotate the cam 304 and segments 43 and 44, the pull-rod 289 has an elongated collar 309 secured thereto by screws 310, and provided with a sprial cam face 311 (see Fig. 11), adapted to cooperate with a roller 312, rotatably mounted upon a bracket 313, secured by screws 314, to the front carriage rail 11, as indicated in Figs. 2, 11 and 13.

It has been pointed out that the carriage 17 should be in neutral position with the cam plates 19—20 and 22 in position to be restored to zero at the time the multiplicand dials are restored to zero, before the pull-rod 289 can be operated to restore the several sets of dials to zero. Therefore, the pull rod 289 is preferably locked when the carriage is out of neutral position. In order to lock the pull-rod 289, a pawl 315 is preferably provided, as indicated in Figs.

11 and 13, adapted for engagement with the left-hand end of the cam collar 309, and, thereby, prevent the pull-rod from being drawn out when the carriage is out of neutral position. The pawl 315 is pivoted at 316 to a bracket 317 mounted on the side plate 7 of the machine. A spring 318, under the screw 319, is adapted to cooperate with the pawl 315 and move or hold it in engagement with the end of the collar 309. When the carriage 17 is in neutral position, as indicated in Fig. 11 of the drawings, the pawl 315 is held out of engagement with the end of the collar 309, so that the rod 289 may be drawn out for restoring the dials to zero. In order to release and hold the pawl in the position indicated, it is preferably provided with a depending lug 320 or other means cooperating with a cam finger 321 secured to the carriage 17 by the screws 322, as indicated in Figs. 2 and 11 of the drawings, the cam 321 preferably engages a pin 323, extending laterally from the lug 320, as shown in Figs. 2, 11 and 13, the engagement taking place only when the carriage 17 is in neutral position. When the carriage is out of neutral position, the pawl 315 will drop into position to engage the end of the collar 309, and prevent operation of the pull rod 289 until the carriage is returned to neutral position.

It has been hereinbefore described that the locking bar 69 shown in Figs 11 and 29, of the drawings is adapted to lock the racks 46 and also the multiplicand dials 55 in set positions, the locking bar being moved to the position indicated in Fig. 29 by means of the pawl 75 on the carriage 17. The locking bar 69 is held in locking position by the lug 78 on the arm 79, moving in behind the bar 69 and held there by the spring 81. The bar 79, as will be seen in Figs. 2 and 11 of the drawings, passes diagonally downward and rearward from its pivot 80 and passes in proximity to the pull-rod 289, which, as shown in Fig. 11 of the drawings, is provided with a notch at 324 into which the bar 79 is adapted to enter as the lug 78 passes back of the locking bar 69 to lock the multiplicand members in the manner described. It will be understood that the racks 46 must be unlocked by restoring the bar 69, before the shaft 41 is rotated to return the multiplicand members and dials to zero. In order that this may occur, the notch 324 is beveled and a dwell 325 is provided on the cam collar 309 so that the pull-rod 289 may be moved outward to move the bar 79 and release the locking bar 69 before rotation of the pull-rod commences by the roller 312 picking up or engaging the spiral cam surface 311.

From this arrangement, it will be understood that after setting up the multiplicand and moving the carriage 17 out of neutral position, no change can be made in the multiplicand even after the carriage has been moved back to neutral position, until the pull-rod 289 has been operated to clear the multiplicand, multiplier and product dials.

*Additional locking mechanisms.*—Various safety and locking devices have already been described, such devices being embodied in the machine to prevent erroneous operation of the machine, and I preferably install additional locking and safety mechanism for insuring the proper sequence of operations on the part of the operator. I have found it desirable to prevent movement of the carriage 17 out of neutral position when no multiplicand has been set up, or after the carriage has been returned to neutral position and before the clearing pull 289 has been operated to clear the machine. This may be accomplished by providing a pawl 326, pivoted, as indicated in Figs. 3 and 28 of the drawings, on the rod or shaft 134, which, as previously described, is mounted on the carriage 17 and adapted for rotating the differential wheels 82. The pawl 326 extends toward the left, when looking from the front of the machine, and is provided with a notch at 327, adapted to engage a lug 328, secured to the base 1 of the machine by a screw 329, as shown in Figs. 2 and 28 of the drawings, the engagement taking place when the carriage is in neutral position at the left end of its run as indicated in Fig. 11 of the drawings. In order to hold the pawl 326 down or bring it into engagement with the lug 328, any suitable spring may be employed, but, preferably there is pivoted at 330 to the pawl below the pivot 134, an arm 331 having a roller 332 resting on and movable along the base 1, and a spring 333 cooperates between the arm 331 and a pin 334, on the pawl 326 to hold the notch end 327, of the pawl down in the position shown in Fig. 28. To reduce the friction of having the long pawl 326 slide on the base plate, an anti-friction roller 335 is preferably screwed to the outer end of the pawl and adapted to roll on the base of the machine when the carriage is moved transversely. With this arrangement, it will be seen that when the carriage is in neutral position to the left of its run, the notch 327 will engage the lug 328 and lock the carriage against movement out of neutral position.

In order to release the pawl 326 when a multiplicand is set up, the multiplicand dials 55, or the hubs thereof as shown in Figs. 2 and 3 of the drawings are preferably provided with discs 336, flattened at 337 and adapted to cooperate with rollers 338, rotatably mounted on arms 339 secured to a rock shaft 340, the latter being pivotally mounted between the partition plate 42 and the side wall 7 of the machine, as shown in Fig. 3 of the drawings. The left end of the rock shaft 340 has, secured thereto, a depending rock arm 341, extending downward, as shown in Fig. 2 of the drawings, and provided with a pin 342 engaging an open slot in the front end of a slidable bar 343, extending rearwardly as indicated in Figs. 2 and 3 of the drawings, and provided at 344 with a wedge enlargement adapted to cooperate with a roller 345, rotatably mounted upon the lower end of a vertically slidable locking bar 346. The locking bar 346 is provided with a slotted hole at 347 cooperating with a screw 348, the latter securing the bar to the side plate 7 of the machine so that it is permitted a limited vertical sliding movement. The lower end of the locking bar 346 is provided with a narrow tongue 346ª, fitting into a socket hole in the base plate 11, as indicated in Figs. 1, 2 and 26 of the drawings, which with the screw 348 serves to guide the locking bar in its vertical sliding movement. A spring 349, extending between a pin 350 on the locking bar 346 and the base of the machine, is adapted to hold it in and restore the locking bar to normal unlocking position, as indicated in Fig. 2 of the drawings. It will be noted that the locking bar 346 extends past the pull-rod 274 for the total products clearing dials and past the rod 124 for reversing or shifting the intermediate gears 116—117—120 to reverse the direction of rotation of the differential wheels. The locking bar 346 is notched at 351 and at 352 to clear the respective bars of rods 274 and 124 and the edge of the locking bar below the notches is made V-shaped at 353 and 354 to cooperate respectively with annular V notches 355, and 356 in the rods 274 and 124 (see Figs. 2, 3, and 12).

The forward end of the slide bar 343 is preferably provided with a spring finger 357, having its forward end beveled for engagement with a roller 358, rotatably mounted by screw 359, on the end of the locking lever 326, as will be seen in Figs. 2, 3, and 28 of the drawings. Therefore, when the carriage is in neutral position, and no numbers are set up on the multiplicand dials, the carriage is locked against movement out of neutral position by the engagement of the pawl 326 with the lug 328 (see Fig. 28). If now one of the multiplicand pulls 51 is operated, it will be seen that the flat surface 337 of the disc 336, on the multiplicand dial, will be rotated out of the position indicated in Fig. 2 of the drawings, and thereby rock the shaft 340 which, through the arm 341, will move the slide 343 forward, so that the beveled edge of the spring 357 will pass under the roller 358 and lift the pawl 326 out of engagement with the lug 328, thereby freeing the carriage 17 for transverse movement to different denominational positions of the multiplier.

It also has been found desirable, in order to prevent operation of the machine, except in the manner described, to arrange that the carriage 17 may be locked by the pawl 326, when returned to neutral position after performing a multiplication, and remain locked until the clearing pull rod 289 has been operated. It will be seen that the spring 357 on the end of the slide 343 is adapted to be deflected laterally when the carriage 17 is returned to neutral position, the spring 357 and slide 343 having been advanced by the previous setting up of the multiplicand. In this manner the pawl 326 is adapted to again engage the lug 328 and lock the carriage against movement out of neutral position until the clearing pull-rod 289 has been operated and the multiplicand racks and dials returned to zero, thereby permitting the beveled end of the spring 357 to again be brought into engagement with the roller 358, when the rack shaft 340 is again operated by setting up a new multiplicand.

It is also important that, when the multiplicand members and dials are operated, it shall be impossible to shift the intermediate gears 116—117—120 for reversing the direction of rotation of the differential wheels 82, and this is preferably accomplished by the locking bar 346, previously described, when the same is moved upward, as indicated in Fig. 26 of the drawings, by the wedge member 344, so that the V edge 354 by entering the notch 356 in the rod 124 will lock the latter until the multiplicand dials have been restored to zero by the pull-rod 289. The locking bar 346 is adapted to also lock the total product resetting pull-rod 274, so that it will be impossible to clear the total product dials while the multiplicand dials show a multiplicand set up thereon, thereby preventing accidental clearing of the total product dials, and necessitating the clearing of the product dials first, together with the restoration to zero of the multiplicand dials and members and the multiplier dials.

When the machine is used for division, it is desirable to eliminate visibility of the product dials and this may be accomplished by means of a shutter 360, (Fig. 14) adapted to close the sight openings 361 in the front of the cover case 5, when the reversing or gear shifting rod 124 is operated to change the direction of rotation of the differential wheels 82 for division. For this purpose, the stud shaft 122 is adapted, when shifted toward the right as viewed from the front of the machine to engage a depending rock-arm 362 (see Figs. 14 and 11), secured to a rock shaft 363, extending toward the front of the machine and mounted in bearings 364 on the side plate 8 of the machine, as seen in Fig. 3 of the drawings. The front end of the rock shaft 363 is provided with an angular rock arm 365 extending through the side plate 8, as will be seen in Figs. 11 and 14 of the drawings, the upper end thereof being rounded at 366 and adapted to engage a socket 367, in the end of the shutter 360, as shown particularly in Fig. 14. A suitable spring 368, preferably surrounding (Fig. 3) the shaft 363, is adapted to rotate the shaft in the opposite direction to move the shutter to open position when the gear shifting rod 124 is moved back to multiplying position. If desired, suitable designating characters or letters may be placed on the shutter 360 in position to become visible when the shutter is moved to close the product dial sight openings, thereby indicating to the operator that the machine is in position for performing division.

*Operation-multiplication.*—The operation of the machine has been in part outlined, while describing the parts; nevertheless, the steps in the operation will be more particularly pointed out. Before describing the operation, attention is called to the fact that as shown and described, the present machine, having three places in the multiplicand and multiplier respectively, requires but five differential wheels 82 and 5 pinions 90 and shafts 91 cooperating therewith. However, six product dials 206 are required, the last product dial to the left being rotated entirely by the tens transfer mechanism. To meet the capacity of the machine illustrated, seven total product dials 247 are provided, the last two dials at the left, being rotated entirely by the tens transfer mechanism, the remaining dials being driven by the shafts 91, as hereinbefore described. The relative arrangement and plan view of the dials and the gear connections thereof for both the product and total product dials is best shown in Fig. 5 of the drawings. Obviously, larger machines may be built by increasing the number of corresponding elements in the multiplicand and multiplier columns and correspondingly increasing the number of product and total product dials. The three place machine, however, is of sufficient capacity for many ordinary problems and fully illustrates the principle of my machine.

Assuming all of the dials appearing at the various sight openings, to be at zero, the first step for multiplication is to set up the multiplicand by means of the multiplicand pulls 51, which are drawn out until the corresponding dials 55 indicate the values of the multiplicand digits. In drawing out one of the multiplicand pulls, the rack 49 thereof, by rotating the gear 52, turns the corresponding dial 55, and simultaneously the rack 46 turns the segments 45 and 39 to move the rack 27 with the corresponding cam slide 19, 20 and 22, the cam slide being moved rearward, this operation taking place only when the carriage 17 is in neutral position, this position being at the extreme left of the machine, as seen in Fig. 11 of the drawings. The various digits of the multiplicand are set according to denominations, by manipulating the corresponding multiplicand pulls 51 to set the corresponding cam slides in the carriage 17.

It has been explained that when the machine is clear and the carriage 17 is in neutral position, the locking pawl 326, by engaging the lug 328, locks the carriage against movement out of neutral position, but in setting the multiplicand dials by operating the pulls 51, the discs 336 are rotated, thereby locking the rock shaft 340 and, by means of the arm 341, the slide 343 moves the beveled end of the spring 357 under the roller 358, thereby releasing the carriage so that it may be moved out of neutral position. The sliding of the bar 343, as just described, is adapted to shift the locking bar 346, thereby locking the total products clearing pull 274 and the bar 124 for shifting the reversing gears, and preventing operation of the machine except for multiplication.

After setting up the multiplicand, the carriage 17 is moved to the right to denominational position with respect to the multiplier dials, by pushing sidewise on the multiplier knob 41. The carriage may be moved to any denominational position of the multiplier and if moved to units place, the rod or shaft 134 will pass out of engagement with the first (hundreds) fork 161, and into engagement with the second (tens) fork (see Fig. 22), and then out of engagement with this (the tens) fork and into engagement with the units fork. The swinging arm 160—161 will be in vertical position when the shaft 134 is in units position directly below the units dial shaft 155. When in this position, the pinion 159 will be in mesh with the pinion 162 on the shaft 134 and by rotating the shaft 134 by means of the knob 141, the differential wheels 82 will be rotated and thereby rotate the product dials by rotating the pinions 90, which, it will be understood, will have been positioned by the respective cam plates 19, 20 and 22, engaging the rollers 107 on the lever arms 100, the amount of movement of the pinions 90 radially of the corresponding differential wheels depending upon the digital values of the multiplicand. The multiplier knob is then rotated in units place an amount corresponding to the units digit of the multiplier, which will be indicated on the units multiplier dial 154.

It will be observed that in a machine of the capacity shown, but five differential wheels 82 and corresponding pinions 90 are required, although six dials are required in the products, the last dial being actuated entirely through the transfer mechanism by the dial of the next lower denomination.

The three multiplicand cam plates 19, 20 and 22 on the carriage 17, are therefore, adapted to position the pinions 90 with respect to the differential wheels 82 in groups of three, when the multiplicand contains three digits. Three denominational positions are provided in the multiplier and, therefore, three groups of the pinions 90 may be selected, a group for each denominational position of the carriage 17. When the multiplier knob 141 is rotated in any denominational position of the multiplier, the corresponding group of pinions 90 will be rotated, adjacent pinions being rotated in opposite directions as previously pointed out. When the pinions 90 are rotated, the corresponding shafts 91 are rotated therewith and, through the intermediate gearing, the corresponding product dials 206 will be rotated twice for each rotation of the shafts 91.

The pinions 90, as explained, have 20 teeth and the intermediate planetary gears 197—198 and 203, being driven by the gears 194, are adapted to rotate the corresponding product dials 206 twice for each rotation of the pinions 90. It will be seen that the differential wheels 82 are divided into ten sectors by the continuous teeth 88, each sector representing a unit of the multiplier in any denomination. Therefore, when the pinions 90 are positioned by the multiplicand cams, they will be moved radially of the differential wheels 82 to the respective circles of teeth 87, corresponding in the number of teeth in each sector to the digital value of the multiplicand, so that for each unit or sector of rotation of the differential wheels the multiplicand will be multiplied by one, the product being accumulated on the product dials 206.

When the rotation of a product dial exceeds 9, the tens will be transferred to the dial of the next higher denomination by the engagement of the single tooth 221 on the corresponding disc 213 with the four-point Geneva wheel 220 thereby rotating the latter one-fourth of a revolution, the Geneva wheel 220, through the shaft 222, rotating the pinion 223 six teeth and hence rotating the large gear 200 of the next denomination six teeth or one-tenth of a rotation. Rotation of the large gear 200, carries the studs 199 and pinions 197 and 198 about the gear 194 and therefore, rotates the gear 203 and the corresponding product dial 206, one space, thus transferring the tens. This type of Geneva transfer mechanism, with the planetary gears has the advantage of being reversible so that if the multiplier knob 141 is turned too far, it can be turned back the desired amount, thereby rotating the differential wheels and pinions in the opposite direction and hence subtracting from the product dials any excess accumulated by over-rotation of the differential wheels. By this construction, it will be seen that the amount shown on the product dials, at all times represents correctly the product of the multiplicand, by the multiplier, the digital value of the latter corresponds to the number of sectors or rotation given to the differential wheels. This will be true in my machine whether the differential wheels are rotated more than nine places when the multiplier knob 141 is rotated in units place, or if rotated the corresponding digital values in more than one denominational position. This is accomplished by providing the transfer mechanism (see Fig. 20) between the multiplier dial shafts 155, the arrangement being such that the single tooth 176 will transfer the units to the next higher denomination, if the multiplier knob 141 is rotated so that the multiplier dial 154, in any denomination, is given more than nine-tenths of a rotation. Thus in multiplying by "nineteen", for instance, the multiplier knob may be turned the full nineteen spaces while in the units position, or one space in the tens position and nine spaces in the units position. In either case, the multiplier will be correctly indicated on the multiplier dials 154 and the correct product on the product dials 206.

The mechanism shown in Fig. 19 of the drawings is intended to prevent backward rotation of the multiplier knob or multiplier dials, the stop pawls 181 engaging the notches 180 of the discs 179 when the multiplier dials 154 are in zero position. Thus, at the beginning of the operation, the multiplier dials 154 can only be rotated toward the right as shown in Figs. 19, and 21. The stop fingers 181, however, are, as previously explained, overlappingly connected toward the right, so that if multiplication is begun, in other than units place of the multiplier, the rotation of the corresponding disc 179 will lift all of the stop pawls or fingers 181, to the right of the one actuated, out of engagement with the corresponding discs 179.

This enables multiplication to be performed by a short cut. For instance, ordinarily, the multiplier knob 141 is moved first to units place of the multiplier and there rotated an amount corresponding to the units digit, then moved back to tens place and rotated an amount corresponding to the tens digit and so on. By means of the short cut, the multiplication of nineteen, for instance, may be made by moving the multiplier knob 141 to the tens place and rotating it toward the right two points so that the tens multiplier dial will indicate two-tens or twenty, then move the multiplier knob 141 to units place and rotate the knob one space toward the left, which may be permitted now, because the corresponding stop fingers 181 have been lifted, the units dial thus being brought to show nine the transfer mechanism, between the multiplier dials, moving the tens dial back to show one. Thus, instead of rotating the multiplier knob 141, one space, in tens and nine spaces in units, the same result may be accomplished by rotating it two spaces in tens and one in units and the multiplier dials will show the same multiplier digits, and the corresponding correct product will be indicated on the product dials.

It has been explained that the locking tooth (see Fig. 16) is adapted to lock the multiplicand cam plates 19, 20 and 22, on the carriage 17, when the carriage is moved out of neutral position, for the purpose of positioning the pinions 90 in denominational groups of the multiplier. The carriage 17, in its movement to the right by means of the pawl 75 (see Fig. 29), is also adapted to move the locking bar 69, thereby locking the racks 46 and the multiplicand dials 55, so that the dials indicate the digital values of the multiplicand and likewise the relative positions of the multiplicand cams 19, 20 and 22, on the carriage 17. When a multiplication is completed in the manner described, the entire problem is visible to the operator, the multiplicand is indicated on the dials 55, the multiplier on the multiplier dials 154, and the product of the multiplicand by the multiplier on the product dials 206. The multiplier digits may be changed, if they do not correctly represent the multiplier, by rotating the multiplier knob 141 in the proper direction, in denominational positions of the multiplier, but after the carriage has been moved out of neutral position the multiplicand cannot be changed until the machine has been cleared. This is required because the lug 78, on the bar 79 drops back of the lock bar 69, thereby holding the same in position to lock the multiplicand dials and the lug 78 can be withdrawn to release the locking bar 69, only by the beveled notch 324, when the clearing pull-rod 289—299 is operated to clear the product dials, the rod, as previously explained, being adapted to simultaneously clear the multiplicand and multiplier dials.

The clearing pull-rod, when drawn out, (this can be done only when the carriage is in neutral position) is adapted as just explained, to release the locking bar 69 then the spiral cam 309—311 coming in contact with the roller 312, will cause the rod 289 to be rotated, thereby rotating the disc 304 (see Figs. 11 and 25). When the disc 304 is rotated, the rock arm 305 will move up the cam face 304ª, to the periphery of the cam segment, thereby rocking the shaft 306 and, by means of the forks 307—308, will move the Geneva discs 213 forward (see Fig. 6) to release the clutches of the product dials. The gear segments 44—43, in the mean time will rock or rotate the shaft 41, carrying the arms 67 into contact with the corresponding pins 68, and restore the multiplicand setting up racks and dials to zero. After passing the dwell 325 the collar 288 (Fig. 11) will come in contact with the pins 287 and 192 (Fig. 13) and further pull on the rod 289 will move the clearing racks 281—282 to clear the product dials, and the racks 188 (Fig. 24), to clear the multiplier dials. The full stroke mechanism 294—295 will compel a full stroke of the rod 289, to fully clear the machine, before the rod can be returned to normal position by its spring 291.

The latch pawl 326 (Figs. 27—28) will lock the carriage 17 in neutral position after the completion of a multiplication and upon the return of the carriage to neutral position, and since the pawl 326 can be released only by the wedge end of the spring finger 357, it is necessary to restore the multiplicand dials to zero and set up a new multiplicand to again release the pawl 326 by means of the spring finger 357. It is, therefore, apparent that the machine must be operated in a predetermined manner and, when so operated, it will show the correct product of the multiplicand shown on the multiplicand dials by the multiplier shown on the multiplier dials.

It has been pointed out that it is frequently desirable to totalize successive products, and for this purpose, the machine is provided with the total products dials 247, of which, in a machine of this capacity, there are seven. The total product dials 247 are rotated from the pinions 90, through the gears 195 and 224, which are of the same size, so that the multiplier dials will be rotated twice for each rotation of the pinions 90 and shafts 91, the intermediate planetary gears and transfer mechanisms being substantially the same as for the product dials. The total product dials are not cleared when the product dials are cleared by the pull-rod 289, thus permitting successive products to be accumulated. The total product dials may, however, be cleared by the pull-rod 274, which, as previously explained, is adapted to open the clutches, 237—239, Fig. 6, for disconnecting the dials from the intermediate gear mechanism and returning them to zero, by means of the mutilated racks 257 and 258, engaging the mutilated pinions 245 (see Fig. 12).

When the machine is being operated for multiplication the locking bar 346 is adapted to be moved to locking position (see Fig. 26) when a multiplicand is set up, thereby locking the total products clearing pull 274, as well as the pull-rod 124 for reversing the direction of rotation of the differential wheels, for division. The locking bar 346 is shown in locking position in Fig. 26 of the drawings.

*Division.*—In order to perform division on the machine, the first thing is to see that all of the dials, including the total product dials, are clear and the carriage and multiplier knob are in neutral position. In order to divide, the dividend must be placed in the machine on the total product dials. This is done by first setting up, on the multiplicand dials, the three digits or figures of the dividend at the right end thereof, then moving the carriage 17 and multiplier knob to units place of the multiplier and turning the knob 141 one space, thereby transferring the three digits to both the product and total product dials. The carriage and multiplier knob or button are then returned to neutral position and the clearing pull 289—299, is operated to clear the product, multiplicand and multiplier dials, the total product dials still retaining the last three figures of the dividend. The remaining digits of the dividend are then set up in the multiplicand and the carriage and multiplier knob are moved to hundreds position of the multiplier, and the knob 141 rotated ten spaces, or one complete turn, thereby transferring the remaining figures of the dividend to the product and total product dials. The carriage and multiplier knob are again returned to neutral position and the product, multiplicand and multiplier dials cleared by operating the pull 299. All of the dials are now cleared, except the total product dials, which show, at the sight openings, the complete dividend. The next step is to shift the reversing rod 124, thereby moving the gear 120 into mesh with gears 115 and 118 to reverse the direction of rotation of the differential wheels 82, when the multiplier knob 141 is rotated, in the usual manner, toward the right (see Figs. 1 and 18). The machine is now set for division and, by shifting the rod 124, as described, the stud shaft 122 will rock the shaft 363 and the arm 365 thereof will shift the shutter 360 to close the product dial sight openings (see Fig. 14) and indicate to the operator that the machine is set for division.

Now set up on the multiplicand dials the divisor and shift the carriage and multiplier knob to hundreds place and turn the knob, meanwhile watching the total product dials, from which the divisor will be subtracted. When the number at the left, as seen in the sight openings of the total product dials, is reduced below the value of the divisor, rotation of the multiplier knob 141 should be discontinued. If, however, the knob is turned too far so that a nine appears at the left of the dividend figures remaining, the knob can be rotated in the reverse direction one space to eliminate the nine and restore the previous partial remainder. The carriage and multiplier knob are then moved to the next or tens denomination and the knob 141 rotated while again watching the decrease of the number appearing on the total product dials until it becomes less than the divisor. The operation is repeated in the units place and if there is a remainder, it will appear on the total product dials. The division having thus been completed, the quotient will appear on the multiplier dials the multiplicand dials showing the divisor, and, as just stated, the total product dials showing any remainder. The machine may then be cleared in the manner described, by operating separately the clearing pulls 299 and 274, to clear the product, multiplicand, multiplier and total product dials, after which the machine may be reversed for multiplication if desired.

*Addition and subtraction.*—The machine is not intended for use as an adding or subtracting machine, but obviously, it may be so used, when operated for the purpose. For adding on the machine, the numbers to be added are set up on the multiplicand dials and the carriage shifted to units place of the multiplier, after which the multiplier knob may be rotated one space, thereby multiplying the multiplicand by one, the resultant product appearing on the product dials, and total product dials being the same as the multiplicand. The multiplicand, multiplier and product dials are then cleared, leaving the number of the total product dials. The operation may be repeated indefinitely by multiplying successive numbers by one, the total of the numbers added being accumulated on the total product dials.

For subtracting, the minuend is set up on the total product dials in the manner previously described for setting up the dividend. The direction of rotation of the differential wheels is reversed by shifting the intermediate gears by means of the rod 124 and then the number or numbers to be subtracted from the minuend are set up on the multiplicand dials and the carriage is moved to units place, after which the multiplier knob may be rotated one space. In this manner a number or successive numbers may be subtracted from another number set up on the total product dials.

It will be understood that I have shown and described one form and size of my improved multiplying machine, but, obviously, various modifications in the details of construction may be made, machines of greater capacity may be made by increasing the numbers denominational sections as desired, and various safety and locking devices may be applied in order to accomplish the results desired, and therefore, I do not wish to be limited to the particular construction shown and described, for various modifications may be made without departing from the spirit and scope of the invention.

I claim:—

1. In a multiplying machine, the combination of a plurality of differential wheels, comprising concentric circles of crown teeth arranged in the same plane, said teeth being arranged in ten sets by ten radially extending teeth forming continuous connections between the several circles of teeth, a pinion mounted for sliding movement radially of each of said differential wheels along one of the continuous teeth thereof, a single manually movable means for simultaneously positioning selected groups of one or more of said pinions according to the respective digits of the multiplicand, and means for simultaneously rotating all of said differential wheels in accordance with multiplier digits after the selection of each group of pinions.

2. In a multiplying machine, the combination of a plurality of differential wheels mounted for simultaneous rotation, a corresponding plurality of pinions mounted for movement radially of the respective differential wheels, a carriage mounted for movement transversely of the axes of said pinions, multiplicand members mounted on said carriage and adapted for positioning said pinions radially of said differential wheels according to the respective digits of the multiplicand when said carriage is moved and means for rotating said differential wheels in accordance with multiplier digits when said pinions have been thus positioned by said carriage.

3. In a multiplying machine, the combination of a plurality of differential wheels, a corresponding plurality of pinions movable radially of the respective differential wheels, a reciprocating carriage mounted for movement transversely of the axes of said pinions, multiplicand cam-members mounted on said carriage, means for setting said multiplicand cam-members in accordance with the digits of the multiplicand, means for moving said carriage when said members are set, means cooperating with said members when the carriage is moved for moving said pinions radially of the differential wheels in accordance with the multiplicand digits and means for rotating said differential wheels in accordance with the multiplier after said carriage has been moved to position said pinions.

4. In a multiplying machine, the combination of a plurality of differential wheels, a corresponding plurality of pinions adapted for cooperation with the respective differential wheels, said pinions being mounted for slidable movement radially of the respective differential wheels, shafts upon which said pinions are keyed and slidably mounted, product dials adapted to be rotated by said shafts, a carriage provided with a plurality of multiplicand cam-members, mounted for transverse movement with respect to said shafts, means for setting said multiplicand cam-members in accordance with the digits of the multiplicand, said members when so set being adapted for slidably positioning said pinions when said carriage is moved, means for moving said carriage to position said pinions, and means for rotating said differential wheels in accordance with multiplier digits after the carriage has been moved to position said pinions.

5. In a multiplying machine, the combination of a plurality of differential wheels, said wheels being mounted on a common shaft for simultaneous rotation, a corresponding plurality of pinions mounted for slidable movement radially of said differential wheels and adapted for cooperation with the respective wheels, a reciprocating carriage mounted for movement transversely of the axes of said pinions and parallel to the shaft of said differential wheels, multiplicand members mounted on said carriage, means for setting said multiplicand members in accordance with the digits of the multiplicand, said members being adapted when the carriage is moved, to position a corresponding number of said pinions, radially of the respective differential wheels, according to the digits of the multiplicand, means adapting said carriage to be moved to different denominational positions of the multiplier, means mounted upon said carriage for rotating said differential wheels according to digits of the multiplier after said carriage has been moved to a selected denominational position, and multiplier dials in said denominational positions adapted to indicate the amount of rotation of said differential wheels.

6. In a multiplying machine, the combination of a plurality of differential wheels mounted for simultaneous rotation, a carriage mounted for movement to denominational positions of the multiplier, means mounted on said carriage for rotating said differential wheels in accordance with digits of the multiplier when the carriage is in the respective denominational positions and multiplier dials for indicating the respective multiplier digits adapted to be connected in each denominational position, said means on the carriage for rotating the differential wheels.

7. In a multiplying machine, the combination of a plurality of differential wheels, a shaft upon which said wheels are mounted, in parallel relation for simultaneous rotation, gearing for rotating said shaft and wheels, a carriage reciprocating in parallel relation to said shaft, means mounted upon said carriage and operatively connected with said gearing for rotating said shaft and wheels, means for preventing rotation of said rotating means except at predetermined denominational positions of said carriage and multiplier dials adapted to be operatively connected with said rotating means when the carriage is in said denominational positions for indicating the amount of rotation of said wheels according to the respective multiplier digits.

8. In a multiplying machine, the combination of a plurality of differential wheels, a carriage mounted for movement to different denominational positions of the multiplier, means mounted upon and movable with said carriage for rotating said differential wheels when the carriage is in the respective denominational positions, multiplier dials adapted to be successively connected with said rotating means on the carriage in each denominational position for indicating the amount of rotation of said differential wheels in accordance with the respective multiplier digits, and transfer mechanism for operating the multiplier dials of higher denomination when the dials of lower denomination are turned backward from zero or forward in excess of nine.

9. In a multiplying machine, the combination of a plurality of differential wheels, a carriage mounted for reciprocation transversely of the machine, a corresponding plurality of product dials adapted to be rotated by the respective differential wheels, means mounted on said carriage for effecting cooperative engagement between said differential wheels and the product dials in accordance with the digits of the multiplicand, means mounted upon and movable with said carriage for rotating said differential wheels in accordance with the digits of the multiplier, means for preventing rotation of said rotating means on the carriage except when the carriage is moved to predetermined denominational positions of the multiplier, and multiplier dials adapted to be connected with and rotated by said rotating means when said carriage is in the respective denominational positions, said dials being adapted to indicate the amount of rotation of said differential wheels in accordance with digits of the multiplier.

10. In a multiplying machine, the combination of a plurality of differential wheels, a corresponding plurality of pinions normally put of engagement with said wheels, but mounted for axial movement radially thereof, means for locking said pinions against rotation when out of engagement with the respective wheels, means for moving said pinions in groups corresponding to the number of digits in the multiplicand for each denomination of the multiplier radially of the respective differential wheels, a product dial of a single denomination permanently connected with and adapted to be rotated by each of said shafts and transfer mechanism for transferring the tens to product dials of higher denomination.

11. In a multiplying machine, the combination of a plurality of differential wheels, a shaft upon which said differential wheels are mounted for simultaneous rotation, each of said differential wheels being provided with ten groups of gear teeth each corresponding to multiplicand digits one to nine, a corresponding plurality of pinions mounted for axial movement radially of said wheels for rotative engagement therewith when said differential wheels are rotated, a carriage provided with members adapted to be set in accordance with the digits of the multiplicand, said members being adapted to position said pinions when the carriage is moved to predetermined positions, means for rotating said differential wheels in said predetermined positions of the carriage and means for locking the carriage against movement when the differential wheels are rotated.

12. In a multiplying machine, the combination of a carriage mounted for movement transversely of the machine, a plurality of multiplicand cams slidably mounted on said carriage, means for positioning said multiplicand cams when said carriage is in neutral position, means for indicating the positions of the respective cams according to the digits of the multiplicand, and means for locking said cams when said carriage is moved out of neutral position.

13. In a multiplying machine, the combination of a carriage mounted for movement transversely of the machine, a plurality of multiplicand cams slidably mounted on said carriage, means for positioning said multiplicand cams when said carriage is in neutral position, means for indicating the positions of the respective cams according to the digits of the multiplicand, means for locking said cams when said carriage is moved out of neutral position, and means for locking said cam positioning means and the multiplicand indicators to correspond with the position of the respective cams, both of said locking means becoming effective only when and remaining effective while said carriage is out of neutral position.

14. In a multiplying machine, the combination of a plurality of multiplicand dials, means for setting said dials in accordance with the multiplicand digits, a carriage mounted for movement transversely of the machine, multiplicand cam members mounted on said carriage and adapted to be moved to operative positions by said means for setting the respective multiplicand dials in accordance with the digits of the multiplicand, said dial setting means being effective for setting the respective cams only when said carriage is in neutral position, means for locking said dial cam setting means and means for locking said cam members when said carriage is moved out of neutral position, a plurality of differential wheels mounted for simultaneous rotation, means mounted upon and movable with said carriage for rotating said differential wheels in accordance with the digits of the multiplier, said last named means being operative only when said carriage is moved out of neutral position to predetermined denominational positions of the multiplier, pinions adapted to be positioned for cooperative rotation with the respective differential wheels, means whereby said pinions are adapted to be positioned by said cam members when the carriage is moved to denominational positions of the multiplier, and multiplier dials adapted to indicate the amount of rotation of said differential wheels according to the digits of the multiplier.

15. In a multiplying machine, the combination of a carriage movable transversely of the machine, a plurality of differential wheels mounted for simultaneous rotation on a shaft parallel to the direction of movement of said carriage, a member mounted on said carriage for manually moving the carriage to predetermined positions, said member being adapted for rotating said differential wheels, shafts and gearing connections whereby said member is adapted for rotating the differential wheels in any position of said carriage, means for locking said member and gearing against rotation except in said predetermined positions of the carriage, a plurality of multiplier dials and means for connecting the respective multiplier dials with said member for rotation with said differential wheels when the carriage is in said predetermined positions.

16. In a multiplying machine the combination of a carriage movable transversely of the machine, multiplicand members mounted on said carriage and movable therewith to different denominations of the multiplier, a plurality of differential wheels adapted for simultaneous rotation in angular amounts proportional to the respective digital values of the multiplier, a rotatable member mounted on said carriage and movable therewith for rotating said differential wheels, a plurality of multiplier dials adapted to be brought into cooperative relation, one at a time, with said rotatable member to be rotated thereby to indicate the amount of rotation of said differential wheels in accordance with the digits of the multiplier, and means for preventing rotation of said multiplier dials beyond the zero point in one direction.

17. In a multiplying machine the combination of a plurality of multiplier dials, a carriage mounted for movement transversely of the machine past said multiplier dials in succession, means on said carriage for rotating said dials when the carriage is positioned successively in predetermined denominational positions of the multiplier, detents for said multiplier dials and means operative by said carriage during movement thereof for engaging and disengaging the successive multiplier dials with the rotating means mounted on the carriage.

18. In a multiplying machine, the combination of a plurality of differential wheels, a corresponding plurality of pinions mounted for radial movement of and for cooperation with the respective differential wheels, the number of differential wheels and corresponding pinions being equal to one less than the sum of the places in the multiplicand and multiplier, and means for simultaneously positioning said pinions in selected groups corresponding to the number of places in the multiplicand, the number of groups which may be thus selected corresponding to the number of denominational places in the multiplier.

19. In a multiplying machine the combination of a plurality of differential wheels mounted for simultaneous rotation, a corresponding plurality of pinions adapted to be rotated by the respective differential wheels, each pinion being operatively connected with a product dial and transfer mechanism, the number of differential wheels and pinions being equivalent to one less than the sum of the places in the multiplicand and multiplier according to the capacity of the machine, a member movable to predetermined denominational positions of the multiplier, said member being provided with means for selecting and positioning groups of said pinions in accordance with the digits of the multiplicand, the number of groups adapted to be selected corresponding with the number of places in the multiplier.

20. In a multiplying machine the combination of a plurality of differential wheels, a corresponding plurality of pinions mounted for slidable movement to engage the respective differential wheels in accordance with the digits of the multiplicand, the number of differential wheels and pinions being equal to one less than the sum of the places in the multiplicand and multiplier according to the capacity of the machine, product dials and transfer mechanism operatively connected with the respective pinions, an additional product dial and transfer mechanism being provided and adapted to be operated by rotation of the dial operatively connected with the pinion and differential wheels of highest denomination, selective members adapted to be set to represent the respective digits of the multiplicand, means for simultaneously moving said selective members to position said pinions in groups corresponding to the number of places in the multiplicand, the number of groups which may be thus positioned being equal to the number of denominational places in the multiplier, and means for rotating said differential wheels after selecting each group.

21. In a multiplying machine, the combination of a plurality of multiplier dials, means for rotating said multiplier dials individually in accordance with the respective multiplier digits, means for preventing reverse rotation of said dials beyond the zero points thereof and means for disabling said last named means, thereby permitting reverse rotation of said dials beyond the zero point.

22. In a multiplying machine, the combination of rotary multiplying elements, product dials adapted to be rotated by said multiplying elements, a plurality of multiplier dials, means for rotating said multiplying elements and simultaneously rotating the respective multiplier dials one at a time in accordance with the multiplier digits, and transfer mechanism between said multiplier dials for moving dials of higher denomination one space in the corresponding direction when adjacent dials of lower denomination are rotated backward from zero to nine or forward from nine to zero.

23. In a multiplying machine, the combination of multiplying elements, product dials adapted to be operated by said multiplying elements, means for connecting the product dials and said multiplying elements for operation in denominational groups according to the respective digits of the multiplicand, means for selecting said groups for each denomination of the multiplier, means for rotating said multiplying elements according to the digits of the multiplier for each denominational group, and multiplier dials for indicating the respective multiplier digits of the multiplier and the amount of rotation of said multiplying elements.

24. In a calculating machine, the combination of a plurality of differential wheels, a corresponding plurality of pinions adapted for cooperative engagement with said differential wheels, dials and transfer mechanism adapted to be operated respectively by said pinions, a carriage movable with respect to said pinions, means mounted upon said carriage for positioning said pinions in denominational groups the number in each group being determined by the number of places in the multiplicand, means for rotating said differential wheels when each group of said pinions is positioned, a plurality of dials for indicating the amount of rotation of said differential wheels in each denominational position and means for reversing the direction of rotation of said differential wheels without changing the direction of rotation of said indicating wheels.

25. In a multiplying machine, the combination of a plurality of differential wheels, a corresponding plurality of pinions adapted to be positioned radially of the respective wheels in accordance with the digits of the multiplicand, shafts upon which said pinions are slidably mounted, annularly grooved collars connected with said pinions, a corresponding plurality of levers pivotally mounted below said shafts and provided with forks cooperating with the annular collars of the respective pinions, a carriage movable transversely of said shafts and levers, a plurality of cam members mounted on said carriage, said cam members being adapted to be positioned in accordance with the digits of the multiplicand and to cooperate with a corresponding number of said levers to position said pinions when said carriage is moved, means for moving said carriage to denominational positions of the multiplier, and means for rotating said differential wheels when said carriage has been thus positioned.

26. In a multiplying machine, the combination with multiplying elements adapted to cooperate with product dials and to be positioned according to the digital values of the multiplicand, of a movable carriage provided with a plurality of multiplicand members adapted, when the carriage is moved, to position said multiplying elements in groups denominatinally of the multiplier, means mounted in the frame of the machine and adapted, when the carriage is in neutral position, for positioning the respective multiplicand members on said carriage and for setting them according to the digits of the multiplicand, and means controlled by the carriage for locking said positioning means and for locking said multiplicand members in set positions when said carriage is moved out of neutral position.

27. In a multiplying machine, the combination of a carriage movable transversely of the machine, multiplying elements, cam-members mounted on said carriage adapted, when set according to the digital values of the multiplicand, to position said multiplying elements when the carriage is moved, means mounted on the carriage for locking said cam-members when set and means for holding said locking means in unlocked position for setting said cam-members when the carriage is in neutral position.

28. In a multiplying machine, the combination of a carriage mounted for movement transversely of the machine to position multiplying elements, multiplicand members mounted upon said carriage and adapted to be positioned according to the digital values of the multiplicand when the carriage is in neutral position, said members being adapted to position said multiplying elements when the carriage is moved from its neutral position to denominational positions of the multiplier, multiplicand setting mechanism adapted to cooperate with said multiplicand members for setting the same when the carriage is in neutral position, multiplicand dials cooperating with said setting mechanism to indicate the set positions of the respective multiplicand members, detents for holding said dials and mechanism in set positions and means for locking said mechanism and dials when said carriage is moved out of neutral position, said locking means being adapted to remain locked when the carriage is returned to neutral position.

29. In a multiplying machine, the combination of a carriage mounted for movement transversely of the machine, a plurality of multiplicand members mounted on said carriage and adapted to be positioned according to the digits of the multiplicand when the carriage is in neutral position, manually operated mechanism for each denomination of the multiplicand for setting said multiplicand members on the carriage, said mechanism being operative only when the carriage is in neutral position, and means operable only when the carriage is in neutral position for simultaneously restoring said multiplicand setting mechanisms and members on the carriage to zero positions.

30. In a multiplying machine, the combination of a carriage mounted for movement transversely of the machine, a plurality of multiplicand members mounted on said carriage and adapted to be positioned according to the digits of the multiplicand when the carriage is in neutral position, manually operated mechanism for each denomination of the multiplicand for setting said multiplicand members, said mechanism being operative only when the carriage is in neutral position, means operable when the carriage is in neutral position for restoring said multiplicand mechanisms and the members on the carriage to zero positions, and locking means, automatically controlled by said carriage, for preventing operation of said restoring means when said carriage is out of neutral position.

31. In a multiplying machine, the combination of a carriage movable transversely of the machine and provided with a plurality of multiplicand members adapted to be set according to the digital values of the multiplicand, multiplying elements adapted to be positioned by said multiplicand members when the carriage is moved to denominational positions of the multiplier, manually operated means for actuating said multiplying elements, multiplier dials for each denomination, means operative by the carriage when moved to denominational positions of the multiplier for placing said dials in engagement with said manually operated means, whereby the dials are adapted to indicate the rotation thereof according to the digits of the multiplier and means for restoring said multiplier dials to zero, said means being operative only when said carriage is in neutral position.

32. In a multiplying machine, the combination of multiplying elements adapted to be rotatively operated in groups according to places in the multiplicand, means for rotating said multiplying elements amounts according to digits of the multiplier, multiplier dials adapted to be rotated individually by said last named means, for indicating the amount of rotation, means cooperating with the respective multiplier dials for preventing reverse rotation of said dials beyond the zero point and means whereby when one of said dials is rotated in the forward direction, the dials to the right thereof may be rotated in the reverse direction beyond the zero point.

33. In a multiplying machine, the combination of a plurality of differential wheels, a corresponding plurality of pinions adapted to be brought into effective engagement with the respective differential wheels in groups corresponding to the number of places in the multiplicand, means for rotating said differential wheels an amount corresponding to the values of the multiplicand digits, multiplier dials for indicating the rotation of said differential wheels, transfer mechanism between said dials and means for preventing rotation of said dials and transfer mechanism backward beyond the zero point, the arrangement being such that the dials are adapted to indicate the correct amount of rotation when said rotating means is rotated forward more than nine places in one denomination of the multiplier.

34. In a multiplying machine, the combination of multiplying elements adapted to be rotated amounts corresponding to the value of the multiplier digits, a plurality of multiplier dials adapted to indicate the amount of rotation of said multiplying elements for each denomination of the multiplier, a carriage movable to different denominational positions of the multiplier, means mounted on said carriage for rotating said multiplying elements when said carriage is positioned denominationally of the multiplier, and gearing connections for each of the said dials for cooperation with said rotating mechanism on the carriage, said rotating mechanism being adapted to be connected with each dial in succession and only when said rotating means is in a denominational position for rotating said multiplying elements.

35. In a multiplying machine, the combination of a plurality of multiplier dials arranged in the same plane with their axes parallel, a pinion secured to each of said dials, arms pivotally mounted for swinging movement about the axes of the respective dials, intermediate pinions mounted on said arms and engaging the respective pinions secured to said dials, a carriage movable transversely of the axes of said dials, a rotatable shaft mounted on said carriage and a pinion secured to said shaft and adapted to be brought into engagement with said intermediate pinions in succession for rotating said dials.

36. In a multiplying machine, the combination of a plurality of multiplier dials arranged in the same plane with their axes parallel, a pinion secured to each of said dials, arms pivotally mounted for swinging movement about the axes of the respective dials, intermediate pinions mounted on said arms and engaging the respective pinions secured to said dials, a carriage movable transversely of the axes of said dials, provided with a rotatable shaft, a pinion secured to said shaft, adapted to be brought into engagement with said intermediate pinions in succession for rotating said dials, means for moving said arms to cause engagement of the respective intermediate pinions with said pinion on the carriage shaft when said carriage is moved to denominational positions of the multiplier, and to disconnect said pinions when the carriage is moved out of the respective denominational positions, and detent means for positioning and holding said arms in positions of disengagement or engagement.

37. In a multiplying machine of the character described, the combination of a plurality of multiplier indicating dials mounted upon parallel shafts located in the same plane, a carriage mounted below said shafts for reciprocation parallel to the plane thereof, pinions secured to said shafts and dials for rotating the same, a manually rotatable shaft mounted on said carriage, a driving pinion secured to said rotatable shaft, and intermediate pinions engaging the pinions connected with said dials and adapted to be brought into engagement in succession with said driving pinion for rotating said dials when said carriage is moved to bring said shaft into predetermined denominational relation with the respective dials.

38. In a multiplying machine of the character described, the combination of a plurality of multiplier dials, each provided with a pinion secured thereto, a corresponding plurality of intermediate pinions adapted to engage the corresponding pinions of the multiplier dials, arms upon which said intermediate pinions are mounted, a rotatable shaft adapted to be located below the respective multiplier dials, said shaft being provided with a pinion, and means for swinging said arms in succession for engaging the corresponding intermediate pinions with the pinion on said rotatable shaft, whereby said shaft, when rotated is adapted to rotate the multiplier dial connected therewith in accordance with the multiplier.

39. In a multiplying machine of the character described, the combination of a plurality of multiplier dials, a plurality of shafts to which the respective dials are secured, discs mounted on said shafts and provided with a single engaging tooth or notch, stop pawls mounted in position for cooperative engagement with said teeth on the respective discs for preventing reverse rotation of the individual multiplier dials beyond the zero point and means for lifting one or more of said pawls to permit reverse rotation of certain of said dials.

40. In a multiplying machine of the character described, the combination of a plurality of multiplier dials, a corresponding plurality of shafts to which said dials are secured, detents for locating said dials in positions for indicating the multiplier, movable arms pivoted on said shafts, intermediate pinions mounted upon said arms and engaging pinions connected to the respective dials for rotating the same, a driving pinion adapted, when engaged by said intermediate pinions, to rotate the corresponding dials and means for automatically engaging and disengaging said intermediate pinions with said driving pinion by moving the respective arms while said dials are held by the detents.

41. In a multiplying machine of the character described, the combination of a plurality of multiplier dials mounted upon parallel shafts located in the same plane, a carriage mounted for reciprocation below and transversely of said shafts, a driving shaft mounted upon and movable with said carriage, intermediate connections adapted to be completed between the respective multiplier dials and said shafts by moving said carriage whereby said dials are adapted to be rotated by said driving shaft when the latter is in the same vertical plane with the corresponding shafts of the multiplier dials, and means for locking said driving shaft against rotation except when in position to rotate one of said multiplier dials.

42. In a multiplying machine of the character described, the combination of a plurality of multiplier dials, a carriage normally in neutral position but adapted for movement to different denominational positions with respect to the multiplier, means mounted on the carriage and adapted to be connected with said multiplier dials in succession for rotating the same, means for restoring said dials to zero and means for locking said restoring mechanism against operation except when said carriage is in neutral position.

43. In a multiplying machine of the character described, the combination of a plurality of multiplier dials mounted upon parallel shafts located in the same plane, a carriage normally in neutral position but mounted for movement transversely of said shafts to different denominational positions of the multiplier, a driving shaft mounted on said carriage and adapted to be connected with the multiplier dials in succession for rotating the same, mutilated pinions mounted on said dial shafts, mutilated racks adapted for cooperation with the respective mutilated pinions for resetting the dials to zero and means for locking said mutilated racks against movement except when said carriage is in neutral position.

44. In a multiplying machine of the character described, the combination of a plurality of multiplier dials mounted upon parallel shafts located in the same plane, a carriage normally in neutral position but movable transversely of said shafts, multiplicand members mounted upon and movable with said carriage, multiplicand setting devices and dials stationary relative to said carriage adapted for setting said multiplicand members when the carriage is in neutral position, a driving shaft mounted upon and movable with said carriage adapted, when positioned denominationally of the multiplier, for rotating the respective multiplier dials, means for simultaneously restoring said multiplier dials, the multiplicand dials and said multiplicand members to zero positions, and means for locking said restoring means against operation, except when said carriage is in neutral position.

45. In a multiplying machine of the character described, the combination with multiplying elements adapted to be rotated in accordance with the multiplier, a plurality of product dials adapted to be operated by said multiplying elements, a plurality of multiplier dials for indicating the multiplier digits and the amount of rotation of said multiplying elements, a carriage normally in neutral position and provided with multiplicand members adapted to cooperate with said multiplying elements in groups, when said carriage is moved to denominational positions of the multiplier, multiplicand dials and devices stationary relative to said carriage for setting said multiplicand members when said carriage is in neutral position, a driving shaft mounted upon and movable with said carriage for rotating said multiplying elements in said denominational positions of the multiplier, means for effecting engagement between said driving shaft and the respective multiplier dials in succession, means for restoring said product dials, the multiplicand dials and said multiplier dials to zero positions simultaneously and means for locking said restoring means against operation except when said carriage is in neutral position.

46. In a multiplying machine of the character described, the combination of a plurality of product dials, a plurality of multiplier dials, a plurality of multiplicand dials, a carriage normally in neutral position but movable to different denominational positions of the multiplier, means cooperating with each set of said dials for resetting the same to zero, a pull-rod adapted for operating said resetting means to reset all the dials in one operation and means controlled by the carriage for locking said pull-rod against operation when said carriage is out of neutral position.

47. In a multiplying machine of the character described, the combination of a plurality of product dials, a plurality of multiplier dials, a plurality of multiplicand dials, a carriage movable from neutral position to different denominational positions of the multiplier, means cooperating with each of said sets of dials for resetting the same to zero, a pull-rod adapted for operating said resetting means to reset all the dials in one operation, said pull-rod being operable only when said carriage is in neutral position and means for locking the carriage against movement out of neutral position during the operation of said pull-rod for resetting the dials.

48. In a multiplying machine of the character described, the combination of a plurality of product dials, a plurality of multiplier dials, a plurality of multiplicand dials a carriage movable from neutral position to different denominational positions of the multiplier, means cooperating with each set of said dials for resetting the same to zero, a pull-rod adapted for operating said resetting means to reset all the dials in one operation, means controlled by said carriage for locking said pull-rod against resetting movement when the carriage is out of neutral position, and means for locking the carriage against movement out of neutral position when said pull-rod is operated to restore the dials to zero.

49. In a multiplying machine of the character described, the combination with a casing, of a plurality of multiplicand setting devices mounted for sliding movement in said casing, a corresponding plurality of dials connected with the respective setting devices for indicating the digital values of the multiplicand when said devices are moved, means for locking said setting devices in set positions, means for setting up a multiplier in the machine and means controlled by said multiplier setting means for locking said multiplicand setting devices while setting up a multiplier.

50. In a multiplying machine of the character described the combination with a casing, of a plurality of slidable members provided with knobs for drawing the same forward with respect to the casing, a corresponding plurality of dials geared to said members for indicating the multiplicand digits, detents for positioning said dials and members, locking means for holding said members in set positions, a carriage slidably mounted for movement transversely of said members, multiplicand cam plates mounted on said carriage, gear connections between said slidable members and said cam plates for setting the latter in accordance with the digits of the multiplicand and means for locking said cam plates in set positions.

51. In a multiplying machine of the character described, the combination of a casing, with a plurality of slidable multiplicand setting members adapted to be pulled forward by knobs at the front of the casing, indicator dials connected with said members for indicating the amount of movement of said members according to the digits of the multiplicand, a carriage mounted for movement transversely of said members, cam plates corresponding in number to said members, slidably mounted on and for movement transversely of the direction of movement of said carriage, gearing between said members and the respective cam plates, whereby the plates are adapted to be correspondingly set by setting said members, means automatically brought into action by moving said carriage for locking said members and said cam plates in set positions, the arrangement being such that said plates are disengaged from the corresponding setting members when said carriage is moved so that said locking means becomes effective.

52. In a multiplying machine of the character described, the combination with a casing of a plurality of multiplicand setting devices slidably mounted in said casing, a corresponding plurality of dials connected with said setting devices for indicating the digital values of the multiplicand, a carriage normally in neutral position but mounted for movement transversely of said setting devices, a plurality of multiplicand cam plates mounted upon said carriage and adapted to be connected with and positioned by movement of the corresponding setting devices when the carriage is in neutral position, means for resetting said devices and cam plates to zero positions, said means being operative only when the carriage is in neutral position and means controlled by the carriage for locking said resetting means against operation when the carriage is out of neutral position.

53. In a multiplying machine of the character described, the combination with a casing, of a plurality of multiplicand setting devices provided with pull-rods extending through said casing, a corresponding plurality of dials adapted to be set by said devices for indicating the digital values of the multiplicand, mechanism for resetting said devices and the dials to zero, manual means for operating said resetting mechanism and full stroke mechanism, associated therewith for compelling the complete resetting of said dials and setting devices to zero when said manual means is operated.

54. In a multiplying machine of the character described, the combination with a casing, of a plurality of multiplicand setting devices adapted to be operated by pull-rods extending through said casing, dials for indicating the multiplicand digits and the amount of movement of said devices, a carriage movable transversely of said devices to different denominational positions of the multiplier, a resetting rod slidably mounted in said casing, means operatively connected with said resetting rod for resetting said dials and the setting device to zero, means controlled by said carriage for locking said resetting rod against operation when said carriage is moved to different denominational positions of the multiplier, and means for automatically unlocking said resetting rod when said carriage is returned to neutral position.

55. In a multiplying machine of the character described, the combination with rotatable multiplying elements, of preliminary setting devices for the multiplicand, multiplicand cam members adapted to be set by said devices and movable to denominational positions of the multiplier for cooperation with said multiplying elements, means for rotating said multiplying elements in denominational positions of the multiplier, means for locking said cam members in set position and means for locking said multiplying elements against rotation except when said cam members are located in denominational positions of the multiplier.

56. In a multiplying machine of the character described, the combination with multiplying elements of a plurality of multiplier dials arranged in denominational position of the multiplier, preliminary representation devices for the multiplicand, multiplicand members adapted to be set by said devices and movable to denominational positions of the multiplier, for cooperation with said multiplying elements, means for locking said multiplying elements and the multiplier dials against operation when said preliminary representation devices are operated for setting said multiplicand members and means for locking said devices and members when said multiplying elements and multiplier dials are operated.

57. In a multiplying machine of the character described, the combination of a plurality of multiplier dials, a plurality of preliminary representation devices for the multiplicand, a resetting member for resetting said multiplier dials and said devices to zero, and means for locking said preliminary representation devices against movement until said resetting member is operated to restore the multiplier dials and said devices to zero.

58. In a multiplying machine of the character described, the combination of a plurality of multiplier dials adapted to be operated in conjunction with multiplying elements, a plurality of preliminary representation devices for the multiplicand, a carriage normally in neutral position but movable transversely of said devices to denominational positions with respect to said multiplier dials, multiplicand members mounted upon said carriage and adapted to be set in accordance with the multiplicand by said devices when the carriage is in neutral position, means for rotating said multiplier dials and the multiplying elements in each denominational position of said carriage, means for locking said preliminary representation devices when said multiplier dials and multiplying elements are rotated, said locking means being adapted to remain effective after said carriage has been restored to neutral position, a manually operated member for resetting the multiplier dials and said preliminary representation devices to zero, and means operated thereby to unlock said devices.

59. In a multiplying machine of the character described, the combination of a plurality of multiplier elements, a corresponding plurality of pinions cooperating with said multiplier elements, shafts upon which said pinions are keyed and slidably mounted, gears secured to the forward ends of said shafts and rotatable therewith, smaller gears mounted upon separate shafts in axial alignment with the first named shafts, stepping up intermediate pinions between the two sets of gears, whereby the second shafts are rotated twice for each rotation of the first named shafts and product dials rotatable in unison with said second named shafts.

60. In a multiplying machine of the character described, the combination of a plurality of multiplier elements, a corresponding plurality of pinions cooperating therewith, shafts upon which said pinions are keyed and slidably mounted, gears secured to the forward ends of said shafts, a corresponding number of smaller gears mounted upon separate shafts in axial alignment with the first named shafts, a larger gear mounted for rotation about the axis of said shafts, stepping-up pinions rotatably mounted on said larger gear and engaging the first and second named gears, the proportions of said gears and pinions being being such that the second named shafts are rotated twice for each rotation of the first named shafts, product dials connected with and simultaneously rotatable by the second named shafts and Geneva gear mechanism for rotating said larger gears and the stepping-up pinions carried thereby one-tenth of a rotation for each rotation of adjacent shafts and dials of lower denomination.

61. In a multiplying machine of the character described, the combination of a plurality of product dial driving shafts, driving gears mounted on the forward ends of said shafts, a corresponding plurality of gears of smaller diameter adjacent to said driving gears respectively and mounted upon shafts in axial alignment with the first named shafts, pairs of pinions of different diameter secured together and engaging respectively said two adjacent gears whereby the second named shafts are rotated twice for each rotation of the first named shafts, a third plurality of shafts in axial alignment with the first and second named shafts provided with product dials secured thereto and clutches for connecting and disconnecting the third named shafts with the second named shafts, said shafts being adapted to be disconnected when resetting said dials to zero.

62. In a multiplying machine of the character described, the combination of a plurality of product dials, driving shafts, a corresponding plurality of driven shafts in axial alignment therewith, intermediate gearing between the respective shafts whereby the second named shafts are rotated twice for each rotation of the first named shafts, a corresponding plurality of product dials secured to shafts in axial alignment with said driven shafts and clutch members between the two last named shafts whereby the dial shafts may be rotated with and may be disconnected from the driven shafts for resetting said dials to zero.

63. In a multiplying machine of the character described, the combination of a plurality of product dial driving shafts, a corresponding plurality of driven shafts in axial alignment therewith, intermediate gearing between said shafts, whereby the second shafts are rotated twice for each rotation of the driving shafts, said gearing including planetary gears normally held against rotation, a corresponding plurality of shafts carrying product dials in axial alignment with said first and second named shafts, Geneva gear mechanism between said product dial shafts and said planetary gearing, the arrangement being such that the planetary gearing of higher denomination is advanced one-tenth of a rotation for each rotation of the adjacent product dial shafts of lower denomination, and clutches for disconnecting the product dial shafts from said second named shafts for resetting the dials to zero without rotating said gearing or the first and second named shafts.

64. In a multiplying machine of the character described, the combination of a plurality of product dials driving shafts, a corresponding plurality of driven shafts in axial alignment therewith, intermediate gearing between said shafts whereby the second shafts are rotated twice for each rotation of the driving shafts, said gearing including planetary gears normally held against rotation, a corresponding plurality of shafts carrying product dials in axial alignment with said first and second named shafts, Geneva gear mechanism between said product dial shafts and said planetary gearing, the arrangement being such that the planetary gearing of higher denomination is advanced one-tenth of a rotation for each rotation of the adjacent product dial shafts of lower denomination, a corresponding plurality of totalizer dials adapted to be simultaneously rotated by said first named shafts and clutches for disconnecting the product dial shafts from said second named shafts for resetting the product dials to zero without rotation of said gearing the other of said shafts or said totalizer dials.

65. In a multiplying machine of the character described, the combination of a plurality of product dial driving shafts, a corresponding plurality of driven shafts in axial alignment therewith, intermediate gearing between said shafts whereby the second shafts are rotated twice for each rotation of the driving shafts, said gearing including planetary gears normally held against rotation, a corresponding plurality of shafts carrying product dials in axial alignment with said first and second named shafts, Geneva gear mechanism between said product dial shafts and the planetary gearing, the arrangement being such that the planetary gearing of higher denomination is advanced one-tenth of a rotation for each rotation of the adjacent product dial shafts of the lower denomination, a corresponding plurality of totalizer dials adapted to be rotated by said first named shafts, a corresponding plurality of intermediate gear mechanism between the totalizer dials and said driving shafts, whereby said totalizer dials are rotated twice for each rotation of said first named shafts, and clutches for disconnecting the product dial shafts from said second named shafts for resetting the product dials to zero without rotating said gearing, the other of said shafts or said totalizer dials and their gear mechanism.

66. In a multiplying machine of the character described, the combination of a plurality of product dial driving shafts, a corresponding plurality of driven shafts in axial alignment with the first named shafts, gearing between said shafts whereby the second shafts are rotated twice for each rotation of the first named shafts, a corresponding plurality of product dials in alignment with and adapted to be rotated by the second named shafts, a corresponding plurality of totalizer dials, intermediate gearing and shafts similar to that for the product dials above and in a plane parallel to said product dials and shafts, gearing between the driving shafts of the respective product and totalizer dials whereby the latter is adapted to be rotated by said product dial driving shafts, and a corresponding plurality of clutches between said totalizer dials and their intermediate bearing whereby the totalizer dials may be disconnected and reset to zero without rotating the intermediate gearing or said product dials and shafts.

67. In a multiplying machine of the character described, the combination of a plurality of product dials, a corresponding plurality of driving shafts, intermediate gears including planetary gear mechanism between said driving shafts and the dials adapted for rotating the dials twice for each rotation of the corresponding driving shafts, adjacent dials and shafts being rotated in opposite directions, multilated pinions connected with said dials, mutilated racks mounted for movement transversely of said shafts on opposite sides of said pinions, said racks being adapted to cooperate with alternate pinions for resetting said dials to zero, and means operative when said racks are moved, for disconnecting the dials from said intermediate gear mechanism whereby the dials may be reset to zero independently thereof.

68. In a multiplying machine of the character described, the combination of a plurality of product dials, a corresponding plurality of driving shafts, intermediate planetary gear mechanism between said dials and the driving shafts for transferring the tens, said gear mechanism being so proportioned as to rotate the dials twice for each rotation of the corresponding driving shafts adjacent driving shafts and dials being rotated in opposite directions, a corresponding plurality of totalizer dials mounted in a different plane from said product dials but adapted to be driven by said driving shafts through similar intermediate planetary gear mechanism, mutilated pinions connected with said product dials, a multilated rack on each side of said pinions, each rack being adapted to cooperate with alternate pinions for resetting the dials to zero, a similar arrangement of mutilated pinions and racks cooperating with said totalizer dials, and means for disconnecting the respective dials and simultaneously operating the corresponding mutilated racks, whereby either set of dials may be reset to zero independently of the other without rotating said intermediate gear mechanism or said driving shafts.

69. In a multiplying machine of the character described, the combination of a plurality of product dials, a corresponding plurality of driving shafts and intermediate gear mechanism for transfer of the tens, mutilated pinions connected with said dials, mutilated racks cooperating with said pinions for resetting the dials to zero, full stroke mechanism cooperating with said mutilated racks to insure complete resetting of the dials and means for disconnecting the dials from said transfer gear mechanism when said racks are operated for resetting the dials to zero.

70. In a multiplying machine, the combination of a plurality of parallel shafts adapted to be rotated differentially in accordance with the products of the multiplicand and multiplier digits, a corresponding plurality of dials mounted upon shafts in axial alignment with the first named shafts, intermediate gear mechanism between said shafts, comprising gears secured to the adjacent ends of said aligned shafts, a corresponding plurality of pairs of pinions meshing with the respective gears, the diameters of said pinions and gears being so selected that the totalizer dial shafts are adapted to be rotated twice for each rotation of the first named shafts.

71. In a calculating machine, the combination of a plurality of parallel actuating shafts, a corresponding plurality of totalizer dial shafts in axial alignment with the first named shafts, intermediate gears including planetary pinions for connecting the first named shafts with the second named shafts, said gearing being so proportioned that the dial shafts are rotated twice for each rotation of the actuating shafts, gears upon which said planetary pinions are mounted, pinions meshing with said gears and mounted upon shafts parallel with the first named shafts and Geneva gears arranged between said dial shafts and the pinion shafts, said Geneva gears being so connected and proportioned that the planetary gears of higher denomination are given one-tenth of rotation for each rotation of adjacent dial shafts of lower denomination.

72. In a multiplying machine, the combination of a plurality of total-product dials, a pull-rod and mechanism for resetting said dials to zero, a plurality of multiplicand mechanisms for setting up and indicating the multiplicand and means controlled by said multiplicand mechanisms for locking said pull-rod against operation when said multiplicand mechanisms are operated to set up the multiplicand.

73. In a multiplying machine, the combination of a plurality of total-product dials, means for resetting said dials to zero means for setting up the multiplicand, including dials for indicating the digital values thereof, means for locking said total-product dials resetting mechanism and means controlled by the dials of said multiplicand setting up means for actuating said locking means, when a multiplicand is set up.

74. In a multiplying machine, the combination of a plurality of total-product dials, a plurality of product dials, differential wheels and pinions for simultaneously actuating both sets of dials, said differential wheels being rotated in one direction for multiplying and in the other direction for dividing, means for rotating said differential wheels in different directions, shiftable intermediate gear mechanism for reversing the direction of rotation of said differential wheels, means for resetting said total-product dials to zero, means for setting up the multipicand, and means controlled by said multiplicand and setting means for simultaneously locking said total-product resetting means and said means for reversing the direction of rotation of the differential wheels.

75. In a multiplying machine, the combination of a plurality of differential wheels, a corresponding plurality of pinions, multiplicand members for positioning said pinions with respect to the differential wheels in accordance with the digits of the multiplicand, means for rotating said differential wheels in accordance with the digits of the multiplier, gearing between said last named means and the differential wheels, adapted to be shifted to reverse the direction of rotation of said differential wheels for division, multiplicand dials adapted to be operated when said members are set and means controlled by said dials for locking said gearing against shifting movement after the multiplicand dials are operated.

76. In a multiplying machine, the combination of a plurality of differential wheels, a corresponding plurality of pinions adapted to be positioned with respect to said wheels in accordance with the multiplicand, a carriage adapted to be reciprocated transversely of the axes of said pinions, said carriage being provided with means for positioning said pinions in groups according to the multiplicand, multiplicand setting members stationary relative to said carriage for positioning said multiplicand means on the carriage when said carriage is in neutral position, means mounted upon said carriage for rotating the differential wheels when said carriage is moved to denominational positions of the multiplier and means controlled by said multiplicand setting members for locking said carriage against movement out of neutral position until said mechanisms are operated for setting up the multiplicand.

77. In a multiplying machine of the character described, the combination of a reciprocating carriage adapted to be moved out of neutral position to different denominational positions of the multiplier, means operable for setting up the multiplicand when said carriage is in neutral position and means for locking said carriage against movement out of neutral position until said means for setting up the multiplicand has been operated.

78. In a multiplying machine of the character described, the combination of a plurality of product dials, multiplying mechanisms for operating said dials, a reciprocating carriage adapted to be moved from neutral position to different denominational positions of the multiplier, means mounted on said carriage for actuating said multiplying mechanisms, multiplicand setting means adapted to be operated when the carriage is in neutral position for setting up the multiplicand, means for resetting said product dials and the multiplicand setting means to zero, and means for locking said carriage against movement out of neutral position, said locking means becoming effective after said carriage has been returned to neutral position and remaining effective during and after said product dials and multiplicand resetting mechanism has been operated, and until a new multiplicand is set up.

79. In a multiplying machine of the character described, the combination of a reciprocating carriage provided with members adapted to be set in accordance with the multiplicand when the carriage is in neutral position, product dials adapted to be operated when said carriage is moved out of neutral position to different denominational positions of the multiplier, multiplicand mechanism adapted to be operated when the carriage is in neutral position for setting up the multiplicand, means adapted to be actuated when said carriage is moved out of neutral position for locking said multiplicand setting mechanisms, means for holding said locking means in locked position when said carriage is returned to neutral position and means for releasing said locking means and resetting said multiplicand mechanism and members and the product dials to zero.

80. In a multiplying machine of the character described, the combination with a plurality of product dials, a plurality of multiplicand dials and a plurality of multiplier dials, of a pull-rod for simultaneously restoring all of said dials to zero, a carriage provided with multiplicand members adapted to be set when the carriage is in neutral position, multiplicand mechanisms and dials for setting said members, means for locking the mechanisms and dials in set positions, means mounted on said carriage engaging and moving said locking means to locking positions when the carriage is moved out of neutral position and means for holding said locking means in locking position after the carriage has been returned to neutral position, said last named means being adapted to be released only by the operation of said pull-rod for resetting all the dials to zero.

81. In a multiplying machine of the character described, the combination with a plurality of product dials, of a casing provided with sight openings for reading the products on said dials, differential gears and pinions for actuating said dials, means for reversing the direction of rotation of said differential wheels when division is performed and means actuated by said reversing means for closing said sight openings and thereby indicating that the machine is set for division.

82. In a multiplying machine of the character described, the combination of a plurality of product dials, a plurality of pinions and differential wheels for rotating said dials, a carriage, means for rotating the differential wheels for different denominational positions of said carriage, means for reversing the direction of rotation of said differential wheels when division is to be performed, a casing provided with sight openings for reading the products on said dials, a shutter for closing said sight openings and means operated by said reversing means for actuating said shutter to close the sight openings when the direction of rotation of the differential wheels is reversed for division.

83. In a multiplying machine, the combination of a plurality of differential wheels, a corresponding plurality of pinions adapted to be brought into coperative relation with the respective differential wheels, manual means for positioning said pinions in groups corresponding to the number of places in the multiplicand and manual means for rotating said diffeerntial wheels in each denomination of the multiplier.

84. In a multiplying machine, the combination of means for the preliminary representation of the multiplicand, means for locking said preliminary representation members after the digital values of the multiplicand have been set up, multiplying elements adapted to be positioned in groups according to the number of places in the multiplicand, and means for selecting and positioning one of said groups for each denomination of the multiplier, 85. In a multiplying machine, the combination of a plurality of multiplying elements, means for selecting said multiplying elements in groups, according to the number of places in the multiplicand, means for operating said multiplying elements for each group according to the digital values of the multiplier, and means for simultaneously indicating the product of each group of the multiplicand by each multiplier digits.

86. In a multiplying machine, the combination of a plurality of differential wheels, a plurality of pinions adapted to be brought into cooperative relation with the respective differential wheels, manual means for selecting and positioning said pinions in groups corresponding to the number of places in the multiplicand or divisor for each denominational position of the multiplier, means for rotating said differential wheels in the different denominational positions, and means for reversing the direction of rotation of said differential wheels for division.

GEORGE M. BACON.